US010592646B2

(12) United States Patent
Ogawa

(10) Patent No.: US 10,592,646 B2
(45) Date of Patent: Mar. 17, 2020

(54) USER AUTHENTICATION METHOD AND SYSTEM FOR IMPLEMENTING THE SAME

(71) Applicant: Passlogy Co., Ltd., Tokyo (JP)

(72) Inventor: Hideharu Ogawa, Tokyo (JP)

(73) Assignee: Passlogy Co., Ltd., Tokyo (JP)

(*) Notice: Subject to any disclaimer, the term of this patent is extended or adjusted under 35 U.S.C. 154(b) by 175 days.

(21) Appl. No.: 15/541,703

(22) PCT Filed: Dec. 28, 2015

(86) PCT No.: PCT/JP2015/086543
§ 371 (c)(1),
(2) Date: Jul. 5, 2017

(87) PCT Pub. No.: WO2017/115427
PCT Pub. Date: Jul. 6, 2017

(65) Prior Publication Data
US 2018/0012000 A1 Jan. 11, 2018

(51) Int. Cl.
*G06F 21/31* (2013.01)
*G06F 21/34* (2013.01)
*H04L 29/06* (2006.01)

(52) U.S. Cl.
CPC .......... *G06F 21/31* (2013.01); *G06F 21/34* (2013.01); *H04L 63/0846* (2013.01);
(Continued)

(58) Field of Classification Search
CPC .................. H04L 63/108; H04L 2463/082
See application file for complete search history.

(56) References Cited

U.S. PATENT DOCUMENTS 7,904,946 B1 * 3/2011 Chu .................. H04L 63/067
726/5
9,002,750 B1 * 4/2015 Chu .................. H04L 63/0838
705/55
(Continued)

FOREIGN PATENT DOCUMENTS

JP 2004-259208 A 9/2004
JP 2008-269342 A 11/2008
(Continued)

OTHER PUBLICATIONS

Lindell, Andrew Y. "Time versus Event Based One-Time Passwords." Internet: www3.safenetinc.comiblogIpdflTime_vs_Event Based_OTP.pdf,[Apr. 24, 2013] (2007). (Year: 2007).*
(Continued)

Primary Examiner — Madhuri R Herzog
(74) Attorney, Agent, or Firm — Studebaker & Brackett PC

(57) ABSTRACT

There is proposed a user authentication method that uses a time-based password (TP) having a relatively long update cycle instead of a TOTP having a conventional short update cycle (e.g., 60 seconds). The present invention is a user authentication method executed by an authentication system that performs authentication of a user who performs access from an information communication terminal device in order to use a usage target system by using a reference terminal device that includes a security token capable of generating a TP. The authentication method includes setting an update cycle of the TP to a first update cycle of 30 days, 1 month, or a time period longer than 1 month, receiving a user authentication request that includes a time-based password generated by the security token according to the set first update cycle, and performing the authentication based
(Continued)

on the TP contained in the received user authentication request.

20 Claims, 24 Drawing Sheets

(52) U.S. Cl.
CPC .. *G06F 2221/2105* (2013.01); *H04L 63/0853* (2013.01); *H04L 63/108* (2013.01); *H04L 2463/061* (2013.01)

(56) References Cited

U.S. PATENT DOCUMENTS

| | | | | |
|---|---|---|---|---|
| 2007/0226784 A1* | 9/2007 | Ueda | ........................ | G06F 21/36 726/5 |
| 2008/0010673 A1* | 1/2008 | Makino | .................. | G06F 21/31 726/6 |
| 2010/0046553 A1 | 2/2010 | Daigle et al. | | |
| 2015/0312242 A1 | 10/2015 | Ogawa | | |
| 2017/0289141 A1* | 10/2017 | Lu | ........................ | H04L 63/0838 |

FOREIGN PATENT DOCUMENTS

| | | |
|---|---|---|
| JP | 2012-221096 A | 11/2012 |
| JP | 2014-149559 A | 8/2014 |
| WO | 2003/069490 A1 | 8/2003 |
| WO | 2014/188554 A1 | 11/2014 |

OTHER PUBLICATIONS

International Search Report issued in PCT/JP2015/086543; dated Mar. 29, 2016.
An Office Action issued by the Japanese Patent Office dated Jul. 31, 2018, which corresponds to Japanese Patent Application No. 2017-169936 and is related to U.S. Appl. No. 15/541,703.

* cited by examiner

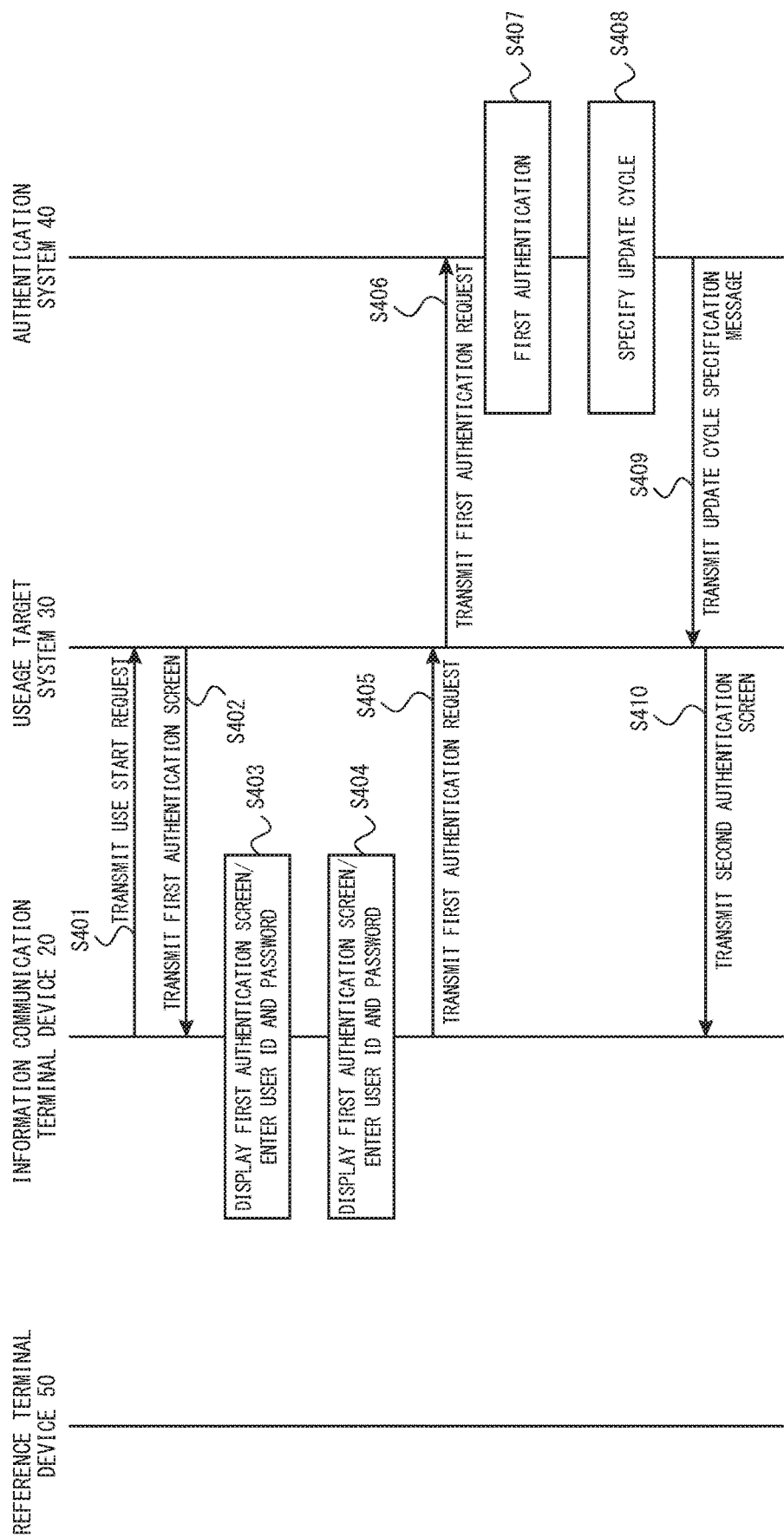

(a)

(b)

USER AUTHENTICATION METHOD AND SYSTEM FOR IMPLEMENTING THE SAME

TECHNICAL FIELD

The present invention relates to a user authentication method and a system for implementing the same.

BACKGROUND ART

In order to protect a computer system from unauthorized access of a malicious third party, "authentication (or certification)" of a user is performed commonly. A simple example of the user authentication includes using a combination of a user ID and a password. With regard to the user authentication, various ways are proposed according to a required security level and a user environment.

For example, Patent Document 1 set forth below discloses a user authentication method that uses a geometric pattern for deriving a password (referred to as a "password derivation pattern" or "password extraction pattern") instead of using the password itself. Specifically, Patent Document 1 discloses a user authentication method and a user authentication system wherein a password derivation pattern is registered in a authentication server for each user in advance, the authentication server generates a presentation pattern and presents the presentation pattern to the user and allows the user to enter the password corresponding to the password derivation pattern of the user in the presentation pattern when the user uses a system, the authentication server performs the authentication of the entered password based on the presented presentation pattern and the registered password derivation pattern of the user, and a usage target system is notified of the authentication result made. In Patent Document 1, an information communication terminal device of the user is used for presenting the presentation pattern.

Further, authentication using a one-time password (OTP) is a user authentication method in which, instead of or in addition to the combination of the user ID and the password, a "disposable" password that is valid only once, i.e., a "one-time password" is issued. In the user authentication method based on the OTP, a server of an authenticator and a device of a person to be authenticated (i.e., user) inevitably share the OTP that is synchronized with the server and the device. For example, the authentication server and the user device generate the OTP in time synchronization with each other by using a common seed (or secret key) and a common random number generation algorithm. The OTP that is issued so as to be synchronized in terms of time is referred to as a time synchronous one-time password (Time synchronous OTP) or a time-based one-time password (Time-based OTP) (TOTP), and is adapted so as to be updated in a relatively short time cycle of, e.g., 30 seconds or 60 seconds such that sufficient time for a malicious challenge is not given to a third party. In order to implement the TOTP authentication, the user is provided with a security token such as, e.g., a hardware token or a software token from the authenticator in advance.

For example, Patent Document 2 shown below discloses a one-time password system that includes a server device and a one-time password device that generates the one-time password that is used when communication with the server device is performed.

Moreover, Patent Document 3 discloses a time synchronous one-time password authentication method capable of easily changing time when a server and an OTP device are synchronized. Specifically, Patent Document 3 discloses operating an OTP device 3 to implement the steps of: acquiring a time difference used for determining time when the OTP device 3 and a server 1 are synchronized; and determining time in which the time difference is reflected and generating the time synchronous one-time password that uses the determined time, and also discloses operating the server 1 to implement the steps of: determining the time in which the time difference is reflected; generating the time synchronous one-time password that uses the time; and comparing the time synchronous one-time password generated by the server 1 with the time synchronous one-time password generated by the OTP device 3 to certificate a user.

CITATION LIST

Patent Document

Patent Document 1: WO 2003/069490
Patent Document 2: Japanese Patent Application Publication No. 2008-269342
Patent Document 3: Japanese Patent Application Publication No. 2014-149559

SUMMARY

Technical Problem

The essence of the user authentication method using the TOTP is that sufficient time for the malicious challenge is not given to the third party, while reasonable entry operation time is given to a true user. Accordingly, for practical purposes, as the update cycle, a relatively short time cycle of 30 seconds or 60 seconds would be selected. In other words, the TOTP is a security approach that reduces risk of unauthorized access without spoiling the convenience of the user. Therefore, setting the update cycle to a relatively long cycle such as, e.g., 1 month may lead to an increase in the risk of the unauthorized access and, for the user authentication method using the TOTP, an idea that the authenticator is not motivated to set the relatively long update cycle or it is inappropriate to call the password having the relatively long update cycle the TOTP in the first place has been predominant.

Further, a browser used by the user has a function of retaining login information (e.g., the user ID or the password) entered in a login screen. Accordingly, there are quite a few users who like to cause the browser to retain the login information because of the inconvenience of entering the login information every time.

However, the conventional TOTP user authentication method is based on the assumption that a different TOTP is usually issued every time the user logs in, and hence it has been useless to cause the browser to retain the login information. This is actually the aim of the TOTP user authentication method that the security level is enhanced, but has been conversely inconvenient to the user who appropriately manages a security environment.

In addition, with a recent improvement in security awareness, a system administrator of a company recommends the user to periodically change the password. However, such a password change is a considerable burden to the user and, as the result of routinization of the reuse of the password and use of an easy-to-remember password, the fact is that it is difficult to secure the security contrary to the intension of the system administrator.

Accordingly, an object of the present invention is to propose a user authentication method that uses a time-based password (TP) having a relatively long update cycle, instead of using the TOTP having the conventional short update cycle (e.g., 60 seconds).

More specifically, an object of the present invention is to propose a user authentication method capable of securing the security level that can provide practicality while introducing the time-based password having the relatively long update cycle, and a system for implementing the user authentication method.

Aside from this, in a case where the user always logs in from the same client in order to use a given service on a computing system, when the authenticator side can determine the sameness of the client, it is possible to consider that a certain type of "What I HAVE" authentication has been performed.

Accordingly, an object of the present invention is to propose a user authentication method in which the sameness of the use environment related to the client of the user is determined, and authentication at an appropriate security level is thereby requested, and a system for implementing the user authentication method.

Specifically, an object of the present invention is to propose a user authentication method in which the update cycle of the time-based password can be changed according to the change of the use environment related to the client of the user, and a system for implementing the user authentication method.

Further, an object of the present invention is to propose a user authentication method that permits the use of the time-based password having the relatively long update cycle (TP), and is capable of securing the security level that can provide practicality by requesting the time-based password having the short update cycle (i.e., the TOTP) in a case where the use environment related to the client of the user is changed, and a system for implementing the user authentication method.

Solution to Problem

The present invention for solving the above problem may be configured by including specific matters of the invention or technical features described below.

The present invention according to an aspect may be a user authentication method in a computing system which may comprise a reference terminal device of a user including a security token capable of generating a time-based password, an information communication terminal device of the user who uses a usage target system, and an authentication system that performs authentication of the user based on a user authentication request transmitted from the information communication terminal device. The user authentication method may include: causing the security token to generate a time-based password having an update cycle that exceeds a use time period based on a login to the usage target system by the user with one authentication; causing the information communication terminal device to display a authentication screen based on authentication screen configuration data received by first access to the usage target system, and allow the user to enter the time-based password generated by the security token in an entry field of the user authentication screen; causing the information communication terminal device to transmit a first user authentication request including the time-based password entered by the user to the authentication system; causing the information communication terminal device to store the time-based password entered in the entry field; and causing the authentication system to receive the first user authentication request transmitted by the information communication terminal device, and to perform the authentication based on the time-based password contained in the received user authentication request and a time-based password generated by the authentication system to determine whether the login to the usage target system is permitted. Further, the user authentication method may include: causing the information communication terminal device to assign, in a case where the information communication terminal device newly receives authentication screen configuration data by second access to the usage target system after the authentication is performed, the stored time-based password to the entry field of the authentication screen based on the newly received authentication screen configuration data, and to transmit another user authentication request including the assigned time-based password to the authentication system; and causing the authentication system to receive the other user authentication request transmitted by the information communication terminal device, and to perform the authentication based on the time-based password contained in the received second user authentication request and the time-based password generated by the authentication system to determine whether the login to the usage target system is permitted.

The present invention according to another aspect may be a user authentication method in a computing system which may comprise a reference terminal device of a user including a security token capable of generating a time-based password, an information communication terminal device of the user who uses a usage target system, and a authentication system that may perform authentication of the user based on a user authentication request transmitted from the information communication terminal device. The user authentication method may include: causing the authentication system to register the security token such that a time-based password generated by the security token of the reference terminal device and a time-based password generated by the authentication system are synchronized in an update cycle of 1 week, 30 days, 1 month, or a time period longer than 1 month; causing the information communication terminal device to display an authentication screen based on authentication screen configuration data received by first access to the usage target system, and to allow the user to enter the time-based password generated by the security token without communicating with the authentication system in an entry field of the user authentication screen; causing the information communication terminal device to transmit a user authentication request including the time-based password entered by the user to the authentication system; causing the information communication terminal device to store the time-based password entered in the entry field; and causing the authentication system to receive the user authentication request transmitted by the information communication terminal device, and to perform the authentication based on the time-based password contained in the received user authentication request and the time-based password generated by the authentication system. Further, the user authentication method may include causing the information communication terminal device to assign, in a case where the information communication terminal device stores the time-based password when the information communication terminal device newly receives authentication screen configuration data by second access to the usage target system after the authentication is performed, the retained time-based password to the entry field of the authentication screen based on the newly received authentication screen configuration data, and to display the assigned time-based password.

Further, the present invention according to still another aspect may be a user authentication method executed by an authentication system that may perform authentication of a user who performs access from an information communication terminal device in order to use a usage target system by using a reference terminal device that may include a security token capable of generating a time-based password. The user authentication method may include: setting an update cycle of the time-based password to a first update cycle of 1 week, 2 weeks, 30 days, 1 month, or a time period longer than 1 month; receiving a user authentication request including a time-based password generated by the security token in accordance with the set first update cycle; and performing the authentication based on the time-based password contained in the received user authentication request.

The user authentication method may further include: acquiring use environment information of the information communication terminal device; and setting the update cycle of the time-based password to a second update cycle shorter than the first update cycle in a case where determination is made that a use environment of the information communication terminal device is changed, based on the acquired use environment information.

The user authentication method may further include transmitting a message indicative of the set update cycle to the information communication terminal in order to notify the user of the set update cycle such that the time-based password is generated according to the set update cycle.

The user authentication method may further include controlling the security token of the reference terminal device such that the time-based password is generated according to the set update cycle.

The user authentication method may further include performing, in a case where a pre-notification of a authentication request is received from the information communication terminal device, the authentication based on the user authentication request received within a predetermined time period from the reception of the pre-notification of the authentication request.

The present invention according to yet another aspect may be a user authentication method executed by an authentication system that may perform authentication of a user who performs access from an information communication terminal device in order to use a usage target system by using a reference terminal device that may include a security token capable of generating a time-based password. The user authentication method may include: storing, for each user, in an authentication database user information including token information related to the security token and use environment information related to a use environment of the information communication terminal device of the user and associated with the user information; receiving a user authentication request transmitted from the information communication terminal device used by one user who is to be authenticated in order to use the usage target system; setting an update cycle of a time-based password based on use environment information contained in the user authentication request; generating a time-based password according to the set update cycle; and performing the authentication of the one user based on a time-based password transmitted from the information communication terminal device and the generated time-based password. Herein, the setting of the update cycle may include setting the update cycle of the time-based password to a first update cycle in a case where determination is made that the use environment information associated with the received user authentication request may be equal to the use environment information stored in the authentication database, and setting the update cycle of the time-based password to a second update cycle shorter than the first update cycle in a case where determination is made that the use environment information associated with the received user authentication request may be unequal to the use environment information stored in the authentication database.

The user authentication method may further include updating the use environment information stored in the authentication database based on the use environment information associated with the received user authentication request.

The use environment information may include at least any of system information, network information, and communication session information of the information communication terminal device.

The time-based password transmitted from the information communication terminal device may be a time-based password stored in the information communication terminal device in previous authentication.

The present invention according to still another aspect may be a computing system which may comprise: a reference terminal device of a user that may include a security token capable of generating a time-based password; an information communication terminal device of the user who uses a usage target system; and an authentication system that performs authentication of the user based on a user authentication request transmitted from the information communication terminal device. The authentication system may register the security token such that a time-based password generated by the security token of the reference terminal device and a time-based password generated by the authentication system are synchronized in an update cycle of 1 week, 2 weeks, 30 days, 1 month, or a time period longer than 1 month. The information communication terminal device may receive authentication screen configuration data by accessing the usage target system, display a authentication screen based on the received authentication screen configuration data, allow the user to enter the time-based password generated by the security token without communicating with the authentication system in an entry field of the user authentication screen, transmits a user authentication request including the time-based password entered by the user to the authentication system, and store the entered time-based password. The authentication system may receive the user authentication request transmitted by the information communication terminal device, and perform the authentication based on the time-based password contained in the received user authentication request and the time-based password generated by the authentication system. The information communication terminal device may assign, in a case where the information communication terminal device stores the time-based password when the information communication terminal device newly receives authentication screen configuration data by accessing the usage target system after the authentication is performed, the stored time-based password to the entry field of the authentication screen based on the newly received authentication screen configuration data, and display the assigned time-based password.

The present invention according to yet another aspect may be a user authentication system performing authentication of a user who performs access from an information communication terminal device in order to use a usage target system by using a reference terminal device that may include a security token capable of generating a time-based password. The user authentication system may include: an authentication database that stores user information of the user; an authentication server that may refer to the authentication database and performs the authentication based on a user authentication request received from the information communication terminal device; and a token management server that may generate a time-based password that is time-synchronized with a time-based password generated by the security token in accordance with a set update cycle. The authentication server may set the update cycle of the time-based password to a first update cycle of 1 week, 2 weeks, 30 days, 1 month, or a time period longer than 1 month. The authentication server may receive a user authentication request including the time-based password generated by the security token from the information communication terminal device, and perform the authentication based on the time-based password contained in the received user authentication request.

The authentication server may acquire use environment information of the information communication terminal device, and set the update cycle of the time-based password to a second update cycle shorter than the first update cycle in a case where the authentication server determines that a use environment of the information communication terminal device is changed, based on the acquired use environment information.

The authentication server may transmit a message indicative of the set update cycle to the information communication terminal in order to notify the user of the set update cycle such that the time-based password is generated according to the set update cycle.

The authentication server may control the security token of the reference terminal device such that the time-based password is generated in accordance with the set update cycle.

The authentication server may perform, in a case where the authentication server receives a pre-notification of an authentication request from the information communication terminal device, the authentication based on the user authentication request received within a predetermined time period from the reception of the pre-notification of the authentication request.

The present invention according to still another aspect may be a user authentication system performing authentication of a user who performs access from an information communication terminal device in order to use a usage target system by using a reference terminal device that may include a security token capable of generating a time-based password. The user authentication system may include: an authentication database that stores, for each user, user information including token information related to the security token and use environment information related to a use environment of the information communication terminal device of the user and associated with the user information; a token management server that may generate a time-based password that is synchronized with a time-based password generated by the security token in a predetermined update cycle based on the token information; and an authentication server that may receive a user authentication request transmitted from the information communication terminal device used by one user who is to be authenticated in order to use the usage target system, and perform the authentication based on the user authentication request. The authentication server may set the predetermined update cycle to a first update cycle in a case where the authentication server determines that use environment information associated with the received user authentication request may be equal to the use environment information stored in the authentication database, and set the predetermined update cycle to a second update cycle shorter than the first update cycle in a case where the authentication server determines that the use environment information associated with the received user authentication request may be unequal to the use environment information stored in the authentication database. Further, the authentication server may perform the authentication based on a time-based password transmitted from the information communication terminal device and the time-based password generated by the token management server.

The authentication server may update the use environment information stored in the authentication database based on the use environment information associated with the received user authentication request.

The present invention according to yet another aspect may be a reference terminal device which comprise a security token capable of generating a time-based password used in user authentication. The security token may include an update cycle specification section that may specify or designate one update cycle selected from a plurality of update cycles, a password generation section that may generate a time-based password in accordance with the specified one update cycle, and a display control section that may perform control such that the generated time-based password is displayed. At least one of the plurality of update cycles may be 1 week, 2 weeks, 30 days, 1 month, or a time period longer than 1 month.

The security token may further include a code table generation section that may generate a code table including the generated time-based password. The display control section may perform control such that the generated code table is displayed.

The security token may further include a storage section that may store a password derivation pattern in a geometric pattern. The code table generation section may generate the code table by assigning each element of the generated time-based password to each cell of the password derivation pattern.

The present invention according to still another aspect may be an information communication terminal device of a user who uses a usage target system that requests user authentication. The information communication terminal device may include: a function of receiving predetermined authentication screen configuration data transmitted from the usage target system, and configuring a predetermined authentication screen in accordance with the predetermined screen configuration data; and a function of storing data entered in a predetermined entry field in the predetermined authentication screen. The stored data may be called up and entered in the predetermined entry field in the predetermined authentication screen in a case where the predetermined authentication screen configuration data is received. Further, the stored data may be a time-based password that may be updated in a cycle of 1 week, 2 weeks, 30 days, 1 month, or a time period longer than 1 month.

The present invention according to yet another aspect may be a browser program executed in an information communication terminal device of a user who uses a usage target system that requests user authentication. The browser program may cause the information communication terminal device to implement: a function of receiving predetermined authentication screen configuration data transmitted from the usage target system, and configuring a predetermined authentication screen according to the predetermined screen configuration data; a function of storing data entered in a predetermined entry field in the predetermined authentication screen; and a function of calling up the stored data and entering the stored data in the predetermined entry field in the predetermined authentication screen in a case where the predetermined authentication screen configuration data is received. Herein, the stored data may be a time-based password that may be updated in a cycle of 1 week, 2 weeks, 30 days, 1 month, or a time period longer than 1 month.

The invention of a method can be grasped as the invention of a system or a device and can also be grasped as the inventions of a program that executes the method and a recording medium that stores the program, and vice versa.

It is noted that, in the present description, means does not mean mere physical means, and includes the case where the function of the means is implemented by software. In addition, the function of one means may be implemented by two or more physical means, and the functions of two or more means may be implemented by one physical means.

Advantageous Effects of Invention

According to the present invention, it is possible to perform the user authentication that uses the time-based password that is updated in synchronization with the long update cycle that is not assumed conventionally.

Further, according to the present invention, in a case where the use environment of the information communication terminal device of the user is changed, the user authentication is performed by using the time-based password having the short update cycle (i.e., the TOTP), and hence it is possible to avert a reduction in security level.

Further, according to the present invention, when the browser is caused to store the previous time-based password, the user can reuse the previous time-based password without altering it in a case where the authentication with the time-based password having the long update cycle is permitted, and it becomes possible to omit the operation and the entry of the security token.

Other technical features, objects, operations and effects, or advantages of the present invention will become apparent from the following embodiments described with reference to the accompanying drawings.

BRIEF DESCRIPTION OF DRAWINGS

FIG. 4A is a sequence diagram for illustrating a user authentication method according to an embodiment of the present invention.

DESCRIPTION OF EMBODIMENTS

Figure 1:
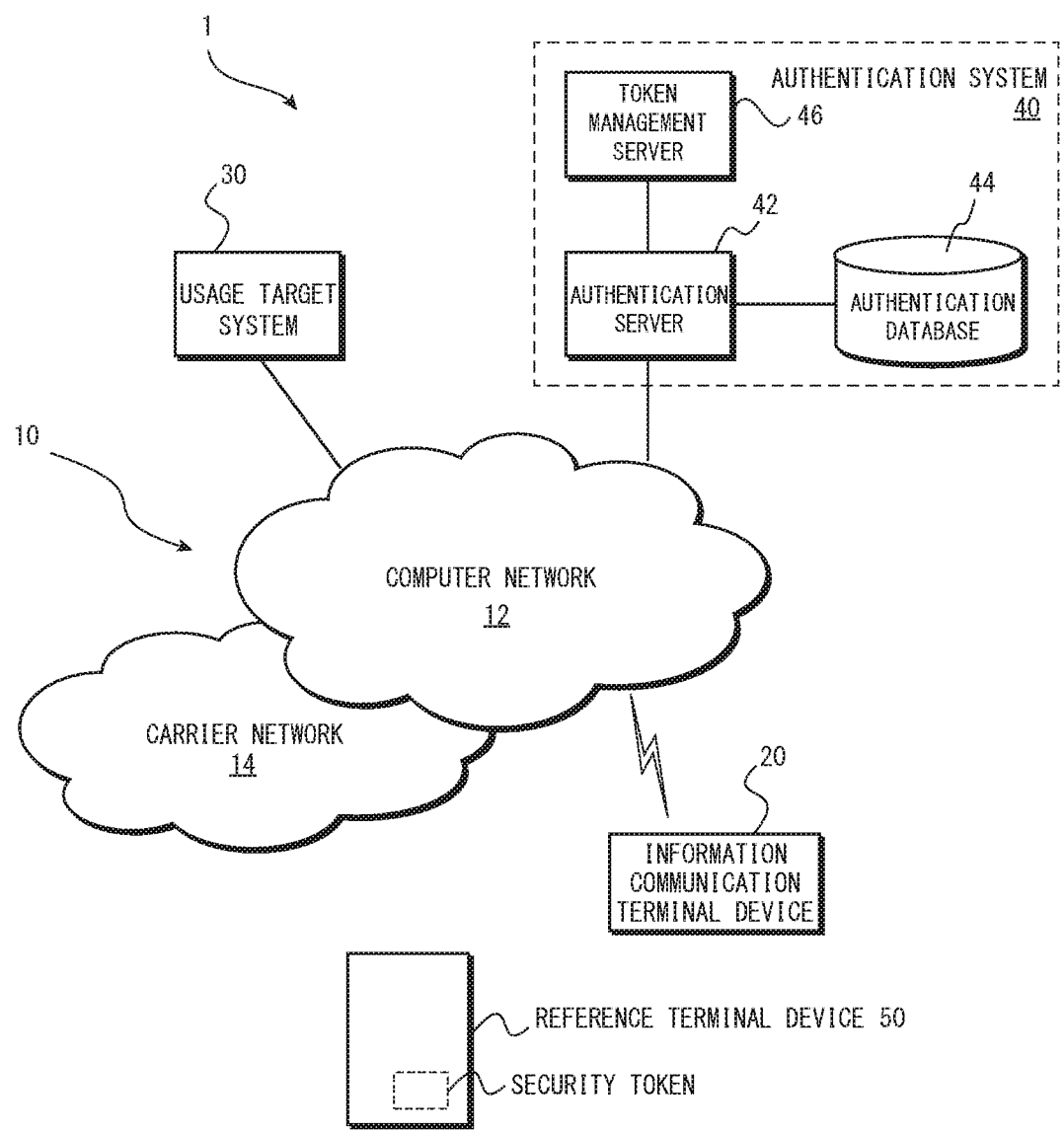
FIG. 1 is a view for illustrating a computing system for implementing a user authentication method according to an embodiment of the present invention.

Hereinbelow, embodiments of the present invention will be described with reference to the drawings. It is noted that the embodiments described below are only exemplary, and are not intended to exclude the application of various modifications and techniques that are not shown below explicitly. The present invention can be variously modified (e.g., combining individual embodiments and the like) and carried out without departing from the gist thereof. In addition, in the following description of the drawings, the same or similar portions are designated by the same or similar reference numerals. The drawings are schematic, and do not necessarily correspond to actual dimensions, ratios, and the like. Further, there are cases where the drawings include portions that are different from each other in dimensional relationship or ratio.

First Embodiment

The present embodiment relates to a user authentication method that uses a one-time password that is updated in synchronization with a relatively long time cycle that is not assumed conventionally, and a system for implementing the user authentication method. The present embodiment especially relates to a user authentication method in which the update cycle of a time synchronous one-time password can be changed depending on a use environment related to an information communication terminal device of a user, and a system for implementing the user authentication method.

FIG. 1 is a view for explaining a computing system for implementing the user authentication method according to an embodiment of the present invention. As shown in the figure, a computing system 1 of the present disclosure may include an information communication terminal device 20, a usage target system 30, and an authentication system 40 that may be connected to each other via a communication network 10 so as to be capable of mutual communication, and further a reference terminal device 50. The reference terminal device 50 may not need to have communication function via the communication network 10 in a case where the user authentication method in the present disclosure is executed, but this is not intended to exclude the capability of the reference terminal device 50 to communicate with other systems via the communication network 10.

The communication network 10 may typically include an IP-based computer network 12. The computer network 12 herein denotes a network having a broad concept that includes the Internet constructed of IP networks that are connected to each other, but the computer network 12 is not limited to the IP network, and networks of every protocol that allow inter-node communication can be used. Further, the computer network 12 may include a wireless network constructed of wireless base stations (e.g., Wi-Fi) that are not shown. Further, the communication network 10 may include a carrier network 14 for a cellular phone, a smartphone, and the like.

The information communication terminal device 20 may typically be a computing device owned by a user and corresponds to, e.g., a personal computer, a cellular phone, a PDA, a smartphone, a tablet computer, and other intelligent devices, but the information communication terminal device 20 is not limited thereto. The information communication terminal 20 may typically be configured to include a control module including a CPU and a memory, and a communication module, and the hardware configuration thereof is already known, and hence its description thereof will be omitted herein. The information communication terminal device 20 can be connected to the computer network 12 via a cable LAN or a Wi-Fi network that is not shown through communication, or can also be connected to the computer network 12 via the carrier network 14 through communication. By this, the information communication terminal device 20 can access various nodes (e.g., a Web server and a cloud server) on the communication network 10. In the present disclosure, the information communication terminal device 20 may have a browser as one of applications, and be configured so as to be able to access the usage target system 30 via the browser. That is, a processor of the information communication terminal device 20 may execute a browser program to thereby implement a browser function on the information communication terminal device 20.

The usage target system 30 may be a system that may provide services that the user is to use, and typically request user authentication when the user uses the services. The usage target system 30 can be a Web server that configures a Web site or a cloud server that provides cloud services. The user can access such severs by using the browser on the information communication terminal device 20. As another example, the usage target system 30 may be the information communication terminal device 10 of the user. That is, the usage target system 30 in this case can be regarded as a function or one of applications implemented by executing an application program in the information communication terminal device 10.

Figure 21:
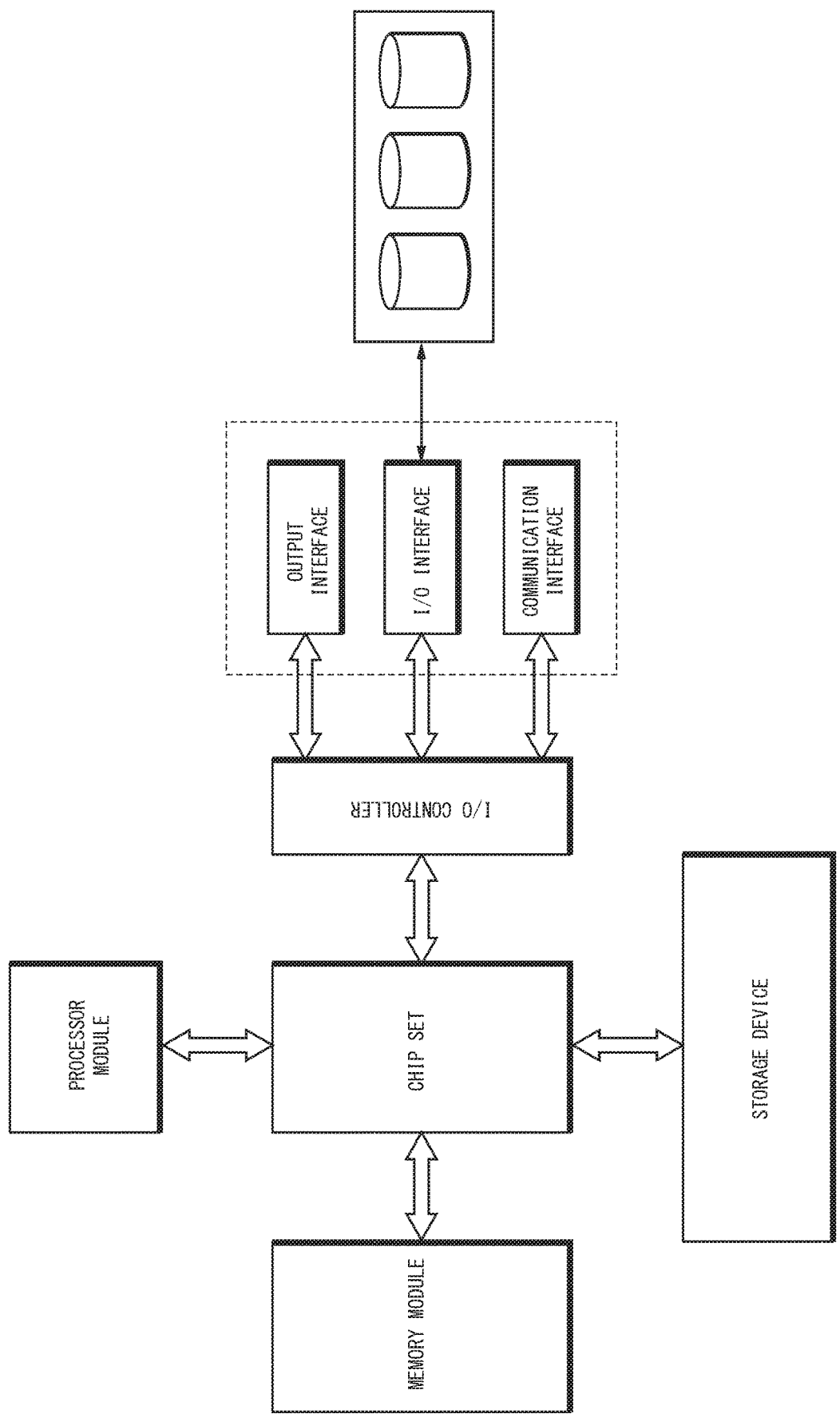
FIG. 21 is a view showing an example of a hardware configuration of a user authentication system according to an embodiment of the present invention.

The authentication system 40 may be a system that may perform authentication of the user who is to use the usage target system 30. The authentication system 40 may include, e.g., an authentication server 42, an authentication database 44, and a security token management server (hereinafter referred to as a "token management server") 46. The authentication system 40 can be implemented by, e.g., one or more general-purpose computing devices. The hardware configuration of such a computing device is illustratively shown in FIG. 21, but the hardware configuration is already known, and hence the detailed description thereof will be omitted. The authentication system 40 may establish a communication session with the information communication terminal device 20 and the usage target system 30 via the communication network 10 by using, e.g., secure communication techniques such as SSL and the like.

The authentication server 42 may be a server computer in cooperation with the authentication database 44 and the token management server 46 to systematically control a user authentication process. The authentication database 44 may be a database system that may store information related to the user that is required for the user authentication (hereinafter referred to as "user information") for each user who uses the usage target system 30 and manages the user information. The user information may include, e.g., a user ID, a password, token information related to a security token, and information related to the use environment related to the information communication terminal device 20 described later (hereinafter referred to as "use environment information"). The authentication database 44 may retains the user information in the form of, e.g., encrypted data.

Figure 2:
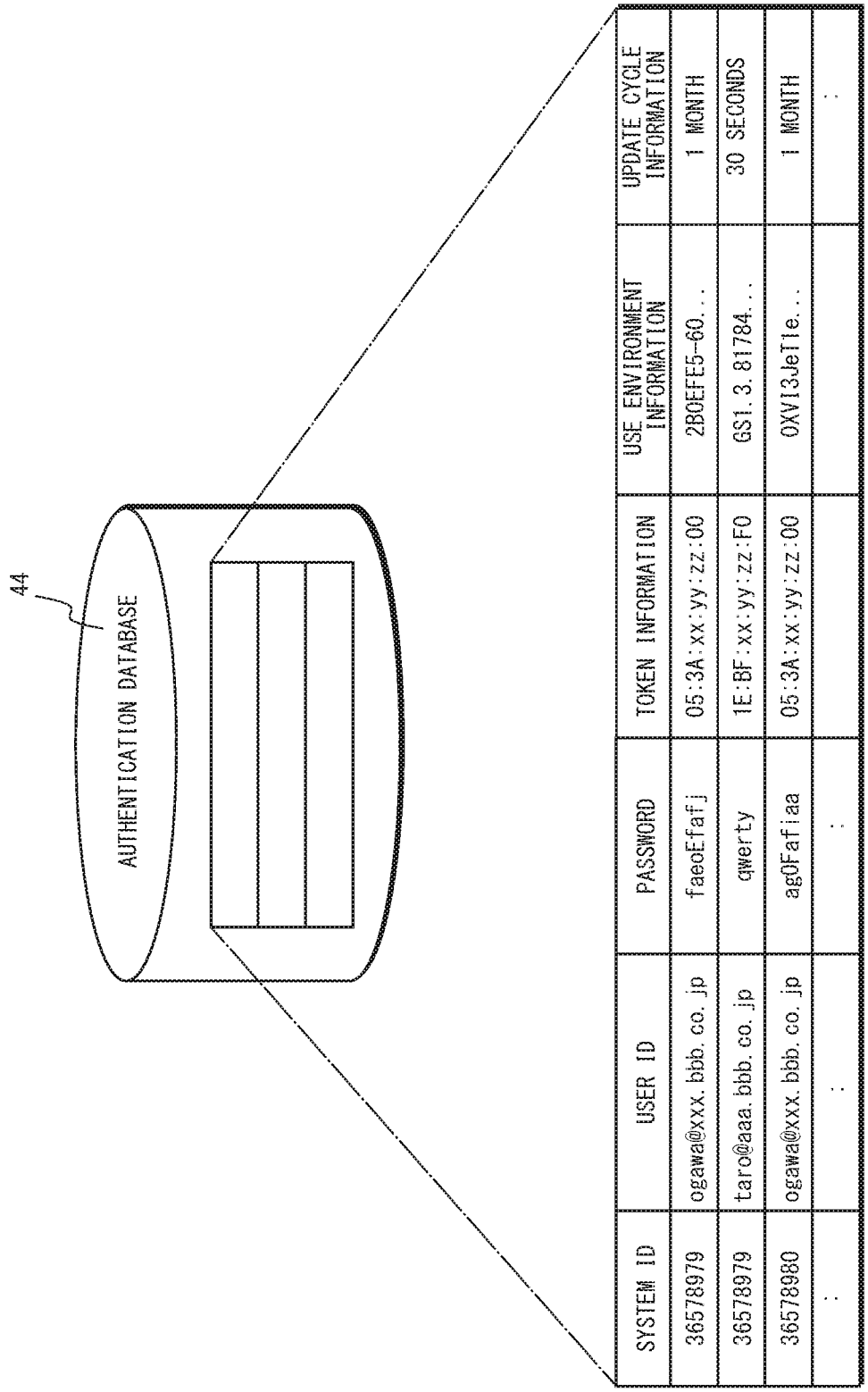
FIG. 2 is a view showing an example of a data structure of an authentication database used in a user authentication method according to an embodiment of the present invention.

FIG. 2 is a view showing an example of a data structure of the authentication database used in the user authentication method according to the embodiment of the present invention. The authentication database 44 may manage the user information of each user as one record for each usage target system 30.

That is, as shown in the figure, each record in the authentication database 44 may be configured to include individual fields of, e.g., a system ID, the user ID, the password, the token information, the use environment information, and update interval information. The system ID may be an ID for identifying the usage target system 30 used by each user. The user ID may be a user identification name in the usage target system 30 assigned to each user. In the present example, an email address owned by the user is used as the user ID. The password may be a password for the user ID. The token information may be a token ID assigned to the security token of the user described later. The use environment information may include at least any of, e.g., system information such as a device ID (production number) and device configuration information, network information such as an IP address, domain information, and an SSID, and communication session information such as a cookie. The IP address may include, e.g., a host address or an IP address group owned by a company where the user works and/or the IP address of the home of the user. The update cycle information may be an update cycle set in the security token and, in this example, the update cycle is set to one of a short update cycle and a long update cycle. The short update cycle may be a cycle for a password that can be actually used only once in one authentication to the usage target system, and may be a cycle of, e.g., 30 seconds, 1 minute, 2 minutes, 3 minutes, or a time period therebetween. On the other hand, the long update cycle may be a cycle that exceeds a use time period based on a login to the usage target system by one authentication, and can be a cycle of, e.g., 1 week, 2 weeks, 30 days, 1 month, 2 months, 3 months, 5 months, 6 months, or days therebetween. It is noted that the update cycle information may be associated with each user ID instead of being associated with each usage target system 30.

The figure shows that the user identified by the user ID ogawa@xxx.yyy.co.jp is registered as the user who can use the usage target systems 30 identified by the system IDs "36578979" and "36578980", and the token ID "05:3A:xx:yy:zz:00" is registered as the security token of the user. In addition, the figure shows that the cookie indicated by "2B0EFE5-60 . . . " is stored as the use environment information of the information communication terminal device 20 of the user, and the long update cycle "1 month" is set as the update cycle information.

Returning to FIG. 1, the token management server 46 may be a server computer for generating a time-based password (hereinafter referred to as a "TP") based on a seed in accordance with a password generation algorithm corresponding to the token ID of the security token of each user. The time-based password may be a token code that may be time-synchronized with a token code generated by the security token of the user. The token management server 46 may generate the TP based on, e.g., the seed based on a parameter that may be updated in the set update cycle. The TP may be a password having only numbers as individual elements, but the TP is not limited thereto. The TP can be constituted by using, e.g., numbers, letters, signs and/or other recognizable figures as individual elements. In addition, the number of elements that constitute the TP may be fixed or may also be variable. In short, the TP may be any TP as long as the token management server 46 and the security token of the user are time-synchronized with each other.

In the present disclosure, the token management server 46 may be configured to be able to manage the update cycle of the TP and change the update cycle under the control of the authentication server 42. In a situation where a low security level is permitted, the update cycle may be set to a relatively long cycle, e.g., a cycle of 1 month or more days. In contrast, in a situation where a high security level is required, the update cycle may be set to a short cycle, e.g., a cycle of 60 seconds. The token management server 46 may respond to, e.g., a TP issue request by the authentication server 42 having received a login request from the user to generate the token code that may be time-synchronized with the token code generated by the security token of the user, and provide the token code to the authentication server 42 as the TP. It is noted that, in reality, the adjustment of time may be performed such that the token codes are considered to be time-synchronized with each other in consideration of time required for entry by the user and the like.

As the password generation algorithm, it is possible to use a password generation algorithm that is already known, and thus the token code may be generated by using, e.g., a mathematical algorithm such as a hash function from a given seed. The seed may be determined based on, e.g., a parameter that is updated in a predetermined update cycle. In addition to this, a previously generated token code or a value that derives from information on the user (e.g., the name, birthday, or email address of the user, or combinations thereof) may also be used.

It is noted that the authentication server 42 may include functions of the authentication database 44 and the token management server 46, and may be configured as one computing device. That is, the functional or logical configuration of the authentication system 40 is arbitrarily determined.

Further, in this example, operation entities of the usage target system 30 and the authentication system 40 are different from each other and are assumed to be systems that are apart from each other physically, but are not limited such systems. In addition, for example, the same business operator may operate both of the usage target system 30 and the authentication system 40, and they may be constituted by one or a plurality of computer systems. In this case, the usage target system 30 may be configured to include the function of the authentication system 40 (or vice versa).

The reference terminal device 50 may be a device for providing the security code (i.e., the TP) for additional authentication to the user in the authentication of the user who is to use the usage target system 30. For example, the reference terminal device 50 may be a computing device such as a smartphone. In this example, the reference terminal device 50 is assumed to be the smart phone having a touch panel function. The reference terminal device 50 may have the security token for generating the TP and displaying the generated TP on a user interface. To the security token, the token ID unique to each user may be assigned.

In this example, the security token may be a software token that is implemented by a security token program for implementing a security token function, and may be adapted to the same password generation algorithm managed by the token management server 46. By this, the reference terminal device 50 can generate the token code (i.e., the TP) that is time-synchronized with the token code generated by the token management server 46 by executing the security token program under the control of a processor. As another example, the reference terminal device 50 may be a hardware token serving as the security token. It is noted that the security code provided by the reference terminal device 50 may include another code other than the TOTP.

The security token of the reference terminal device 50 can generate the TP with the seed and the password generation algorithm shared by the token management server 46. The reference terminal device 50 may display the generated TP on, e.g., the user interface without altering the TP. Alternatively, as shown in another embodiment, the reference terminal device 50 may embed the generated TP in a code table in accordance with a predetermined arrangement rule, and display the code table on the user interface.

The reference terminal device 50 may not be necessarily connected to the communication network 10, but may be connectable to the communication network 10. For example, the reference terminal device 50 may be connected to the information communication terminal device 20 via the communication network 10. Alternatively, the reference terminal device 50 may be connected to the information communication terminal device 20 via a USB interface or the like, or may also be connected to the information communication terminal device 20 via short-range wireless communication such as Bluetooth (registered trademark) or NFC (Near Field radio Communication). Further, the reference terminal device 50 may also be connected to the usage target system 30 or the authentication system 40 via the communication network 10.

Figure 3:
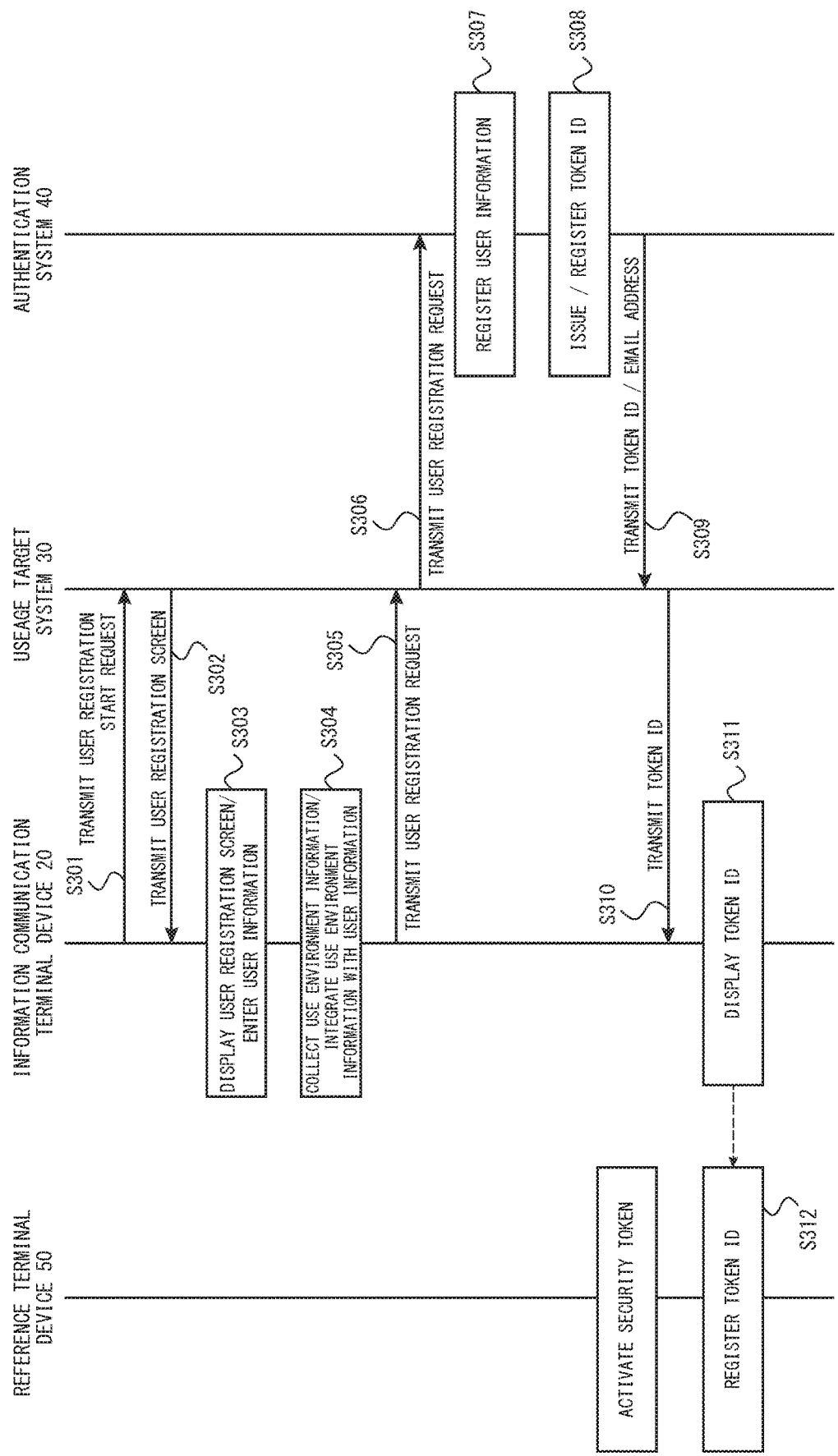
FIG. 3 is a sequence diagram for illustrating a user authentication method according to an embodiment of the present invention.

FIG. 3 is a sequence diagram for illustrating the user authentication method according to the embodiment of the present invention. Specifically, the figure shows the sequence of a registration process of the user information in the user authentication method.

First, prior to the use of the usage target system 30 that requests the user authentication, the user may be requested to perform user registration to the usage target system 30. The user registration may include association of the user with the security token on the reference terminal device 50 of the user in addition to typical registration of the user ID and the password.

That is, for example, in a case where the user has accessed an authentication screen (login screen) of the usage target system 30 via the browser on the information communication terminal device 20 but has not performed the user registration to the usage target system 30 yet, the user may be guided from the authentication screen to a user registration screen. For example, when the user selects a user registration button provided on the authentication screen, the information communication terminal device 20 may transmit a user registration start request for starting the procedure of the user registration to the usage target system 30 (S301) and, in response to this, the usage target system 30 may transmit user registration screen configuration data to the information communication terminal device 20 (S302). Upon receipt of this, the information communication terminal device 20 may display the user registration screen on the browser, and the user may enter the user information in the user registration screen (S303). The user information may typically include the user ID (and/or the email address) and the password, and further include, e.g., information related to the profile of the user.

During the entry of the user information by the user or after the entry thereof, the information communication terminal device 20 may collect the use environment information, and associate or integrate the use environment information with the user information (S304). As will be described in other embodiments, the collection of the use environment information may be implemented by, e.g., executing Javascript (registered trademark) contained in the screen configuration data using the browser on the information communication terminal device 20. The information communication terminal device 20 may transmit the user registration request that may include the user information resulting from the integration to the usage target system 30 (S305) and, upon receipt of this, the usage target system 30 may transmit the user registration request to the authentication system 40 (S306). The authentication system 40 may register the user information contained in the received user registration request in the authentication database 44 (S307). The use environment information may additionally include information that the system on the reception side can passively collect under, e.g., protocol communication. The information communication terminal device 20 may transmit the user information to the authentication system 40 via the usage target system 30 in this example, but the information communication terminal device 20 may transmit the user registration request that includes the user information directly to the authentication system 40.

Further, the user may perform activation of the security token on the reference terminal device 50. For example, at the time of the registration of the user information described above, the authentication system 40 may issue the token ID and register the token ID in the authentication database 44 under the control of the token management server 46 (S308), and transmit the token ID to the usage target system 30 together with the email address of the user (S309). Upon receipt of this, the usage target system 30 may generate an email that may include the token ID, and transmit the email to the registered email address of the user (S310). The user may receive the email with, e.g., an email client on the information communication terminal device 20, and display the email on the user interface (S311).

The user may enter the displayed token ID in the registration screen of the security token activated on the reference terminal device 50 (S312). By way of this, the token ID of the user in the authentication system 40 and the token ID of the security token on the reference terminal device 50 may be associated with each other, and the use of the TP may be allowed.

Thus, the user information for using the usage target system 30 may be registered in the authentication system 40, and it becomes possible for the user to use the usage target system 30 by using the information communication terminal device 20 and the reference terminal device 50.

Figure 4B:
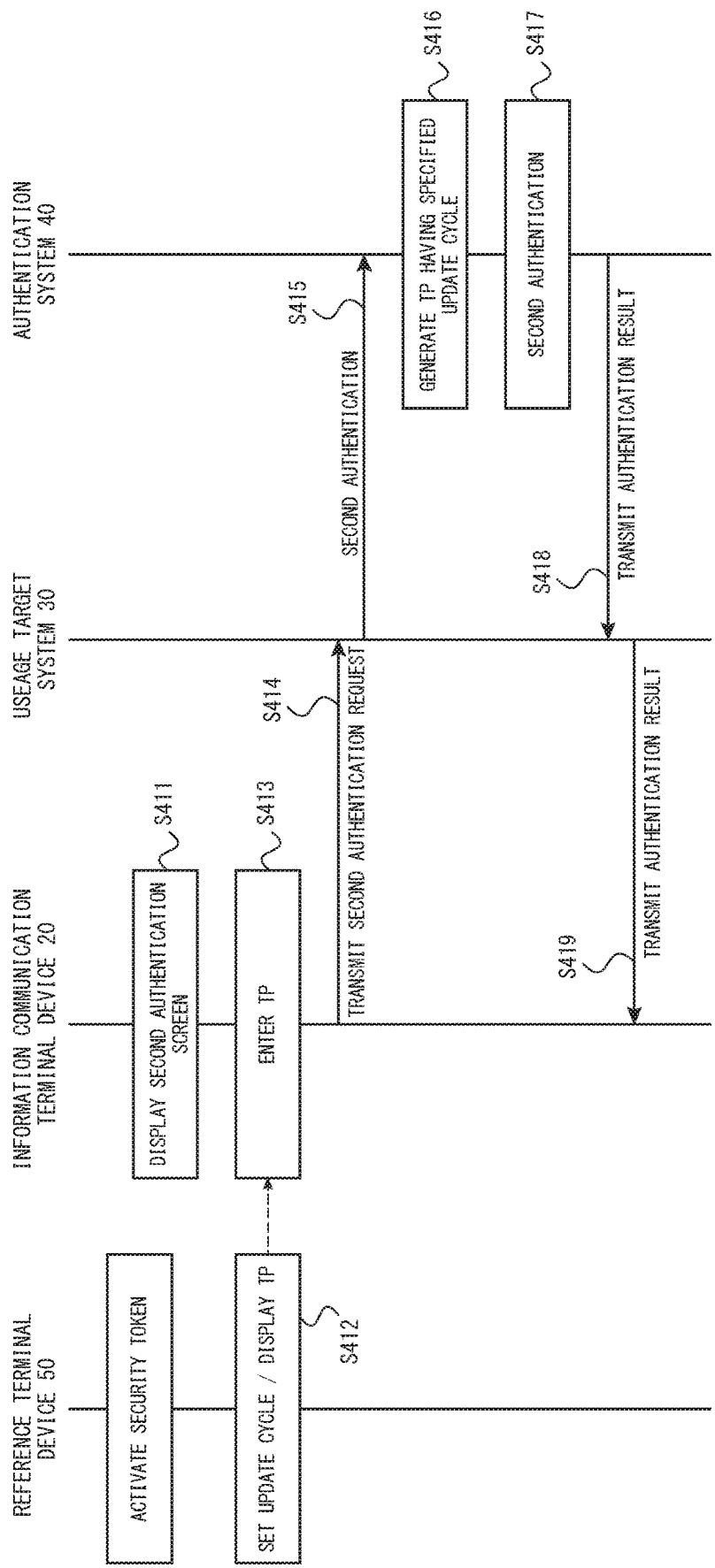
FIG. 4B is a sequence diagram for illustrating the user authentication method according to an embodiment of the present invention.

FIGS. 4A and 4B are sequence diagrams for illustrating the user authentication method according to the embodiment of the present invention and, specifically, the figures show the sequence of the user authentication process in the user authentication method.

As shown in FIG. 4A, when the user who has finished the user registration operates the browser on the information communication terminal device 20 in order to use the usage target system 30, the information communication terminal device 20 may transmit a use start request to the usage target system 30 (S401). In response to this, the usage target system 30 may transmit first authentication screen configuration data to the information communication terminal device 20 (S402). Such authentication screen configuration data may include the script such as Javascript (registered trademark) or a program. Upon receipt of this, the information communication terminal device 20 may display, e.g., a first authentication screen 500 shown in FIG. 5 on the browser, and the user may enter the user ID and the password in a user ID entry field 501 and a password entry field 502 in the first authentication screen 500, and select an authentication button 503 (S403). At this point in time, the information communication terminal device 30 may display a dialog box for selecting whether or not the registration of the collected use environment information to the authentication database 44 is enabled, and the user may be caused to select whether or not the registration thereof is enabled. Further, the information communication terminal device 20 may cause the browser to store the entered user ID and password under the instruction of the user.

Next, the information communication terminal device 20 may collect the use environment information (S404). The collection of the use environment information may be implemented by, e.g., executing the script contained in the first authentication screen configuration data using the browser on the information communication terminal device 20. Subsequently, the information communication terminal device 20 may generate a first authentication request based on the entered user ID and password and the collected use environment information, and transmit the first authentication request to the usage target system 30 (S405). Upon receipt of this, the usage target system 30 may transmit the first authentication request to the authentication system 40 (S406). At this point in time, the usage target system 30 may additionally collect information that can be collected under, e.g., the protocol communication (e.g., an IP address of a proxy or the like) as the use environment information, and transmit the information after associating or integrating the information with the first authentication request.

The authentication system 40 may refer to the authentication database 44, and perform first authentication of the user based on the received first authentication request (S407). In a case where the authentication system 40 may approve the first authentication, the authentication system 40 may further specify a required security level, e.g., the update cycle of the TP based on the received use environment information (S408). By way of this, the token management server 46 may set the update cycle of the TP for the user to the specified update cycle.

For example, in a case where the authentication system 40 may determines that the use environment information received this time is equal to the use environment information stored in the authentication database 44, the authentication system 40 may permit the authentication with a low security level, and specify a long update cycle (e.g., 1 month).

On the other hand, in a case where the authentication system 40 determines that the use environment is different from the use environment stored in the authentication database 44 based on the use environment information received this time, the authentication system 40 may specify a short update cycle (e.g., 60 seconds) in order to execute the authentication with a high security level.

Figure 6:
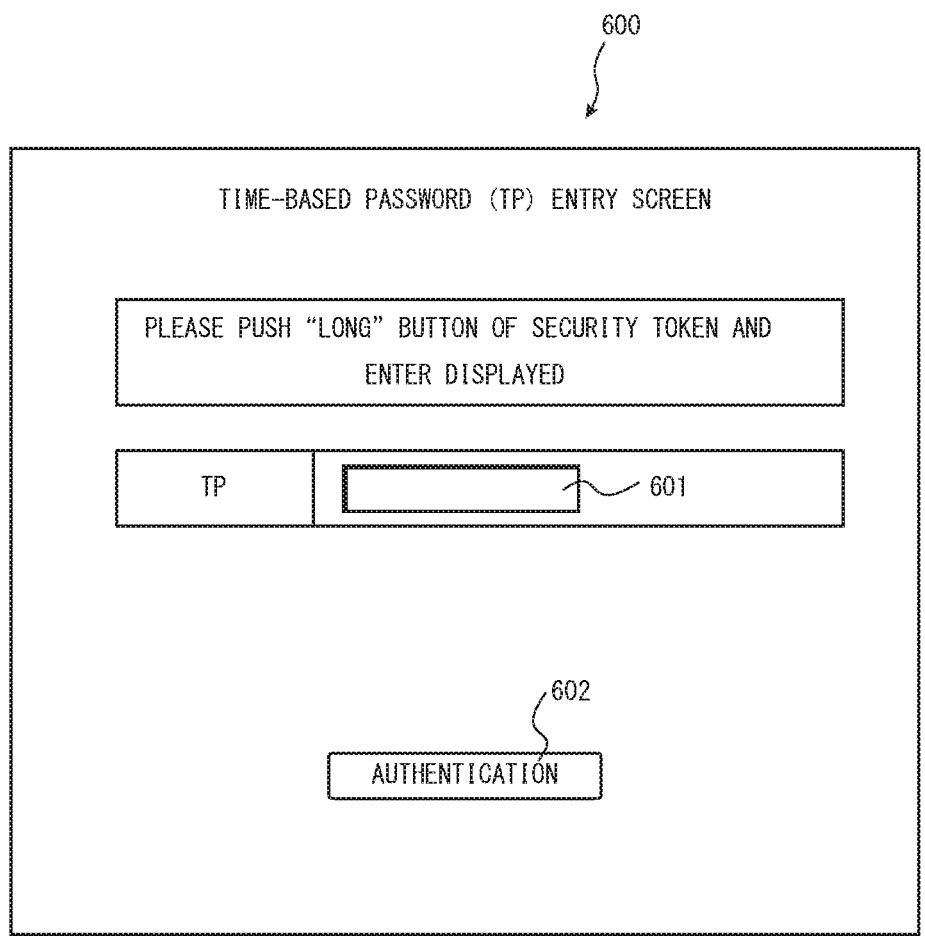
FIG. 6 is a view showing an example of an authentication screen displayed on an information communication terminal device in a user authentication method according to an embodiment of the present invention.

The authentication system 40 may transmit a message that specifies the update cycle of the TP (hereinafter referred to as an "update cycle specification message") to the usage target system 30 in order to request the TP having the security level corresponding to the use environment of the user (S409) and, whereby, the usage target system 30 may transmit second authentication screen configuration data that may contain the update cycle specification message to the information communication terminal device 20 (S410). Upon receipt of this, the information communication terminal device 20 may display a second authentication screen that includes the update cycle specification message on the browser (S441 of FIG. 4B). FIG. 6 is a view showing an example of a second authentication screen 600. By way of this, the user may be allowed to enter the TP having the specified update cycle. When the user operates the security token of the reference terminal device 50 to set the update cycle of the TP to the specified update cycle, the reference terminal device 50 may generate the TP corresponding to the set update cycle, and display the TP on the user interface (S412). The user may confirm the TP displayed on the user interface of the reference terminal device 50, and enter the TP in the second authentication screen 600 displayed on the browser (S413).

Figure 7:
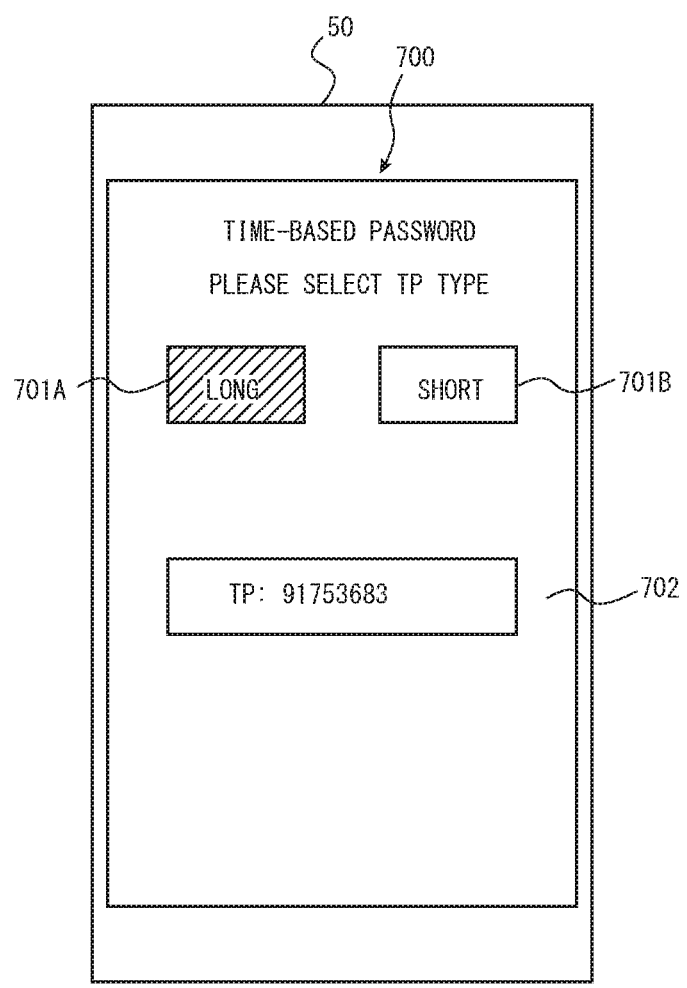
FIG. 7 is a view showing an example of a TP presentation screen displayed on a reference terminal device in a user authentication method according to an embodiment of the present invention.

FIG. 7 is a view showing an example of a TP presentation screen displayed on the user interface of the reference terminal device in the user authentication method according to the embodiment of the present invention. As shown in the figure, a TP presentation screen 700 includes two types of update cycle specification buttons, i.e., update cycle specification buttons 701A and 701B, and a TP display area 702. In the present example, the button 701A for specifying the long update cycle may be selected by the user, and the TP "91753683" generated in accordance with the long update cycle is shown. The user may enter the displayed TP in a TP entry field 601 of the second authentication screen 600 on the information communication terminal device 20 shown in FIG. 6, and select an authentication button 602. The information communication terminal device 20 may cause the browser to store the TP under, e.g., the instruction of the user.

For example, in a case where the TP having the long update cycle is specified, it is possible to use a previous TP without altering it depending on the frequency of access to the usage target system 30 by the user, and there are cases where the user causes the browser to store the TP in consideration of this. Accordingly, in a case where the user has determined that the TP having the long update cycle (e.g., the cycle of 1 month) is specified, the user may reuse the TP stored in the browser in the entry to the second certified screen without altering it without operating the reference terminal device 50. Alternatively, in a case where the TP has been stored in the browser when the user has received the approval of the authentication previously, the browser may automatically assign the TP to the TP entry field 601 of the second authentication screen in accordance with the cookie or the like, and present the second authentication screen with the TP entered therein to the user.

On the other hand, in a case where the TP having the short update cycle (i.e., which here means the TOTP) is specified, even when the previous TP is stored in the browser, the TP is no longer valid, and hence the user is inevitably required to operate the reference terminal device 50.

Returning to FIG. 4B, when the user enters the TP in the second authentication screen, the information communication terminal device 20 may transmit a second authentication request based on the entered TP to the usage target system 30 (S414) and, upon receipt of this, the usage target system 30 may transmit the second authentication request to the authentication system 40 (S415).

The authentication system 40 having received the second authentication request may generate the TP having the specified update cycle under the control of the token management server 46 (S416), and perform second authentication based on the generated TP and the second authentication request (S417). In a case where the authentication system 40 approves the second authentication, the authentication system 40 may approve the user authentication eventually, and transmit the authentication result to the usage target system 30 (S418). In a case where the user has enabled the registration of the use environment information (see FIG. 5), the authentication system 40 may update the use environment information registered in the authentication database 44 based on the received use environment information.

The usage target system 30 having received the authentication result may transmit the authentication result to the information communication terminal device 20, from whence proceeding to the next process (S419). For example, in a case where the authentication result indicates the disapproval of the authentication, the user may be notified of login failure. On the other hand, in a case where the authentication result indicates the approval of the authentication, the login may be accepted, and it becomes possible to use the usage target system 30.

Figure 8:
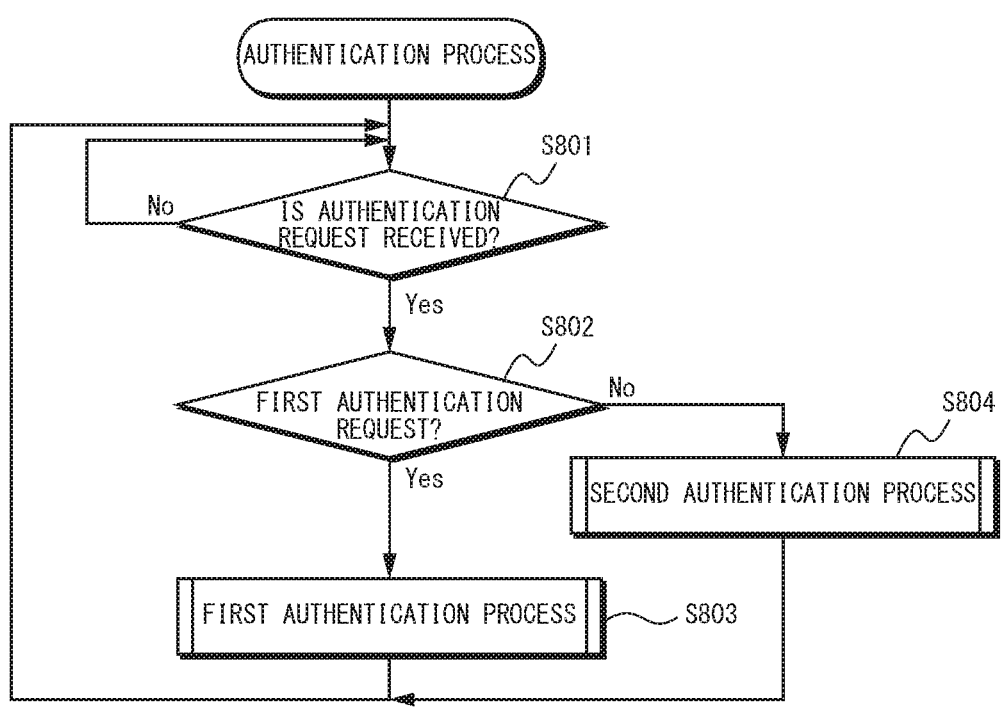
FIG. 8 is a flowchart for illustrating an authentication process in a authentication system according to an embodiment of the present invention.

FIG. 8 is a flowchart for illustrating the authentication process in the authentication system according to the embodiment of the present invention.

As shown in the figure, the authentication server 42 of the authentication system 40 may wait until the authentication server 42 receives the authentication request from the information communication terminal device 20 of the user via the usage target system 30 (No in S801). When the authentication server 42 receives the authentication request from the information communication terminal device 20 of the user (Yes in S801), the authentication server 42 may determine whether or not the authentication request of the user is the first authentication request (S802) and, in a case where the authentication server 42 determines that the authentication request is the first authentication request (Yes in S802), the authentication server 42 may perform a first authentication process (S803). In contrast to this, in a case where the authentication server 42 determines that the authentication request is not the first authentication request, i.e., the authentication request is the second authentication request (No in S802), the authentication server 42 may perform a second authentication process (S804). The detail of each of the first authentication process and the second authentication process will be described with reference to FIG. 9 and FIG. 10. When the authentication server 42 ends the first authentication process or the second authentication process, the authentication server 42 may wait for the reception of the authentication request again (S801).

Figure 9:
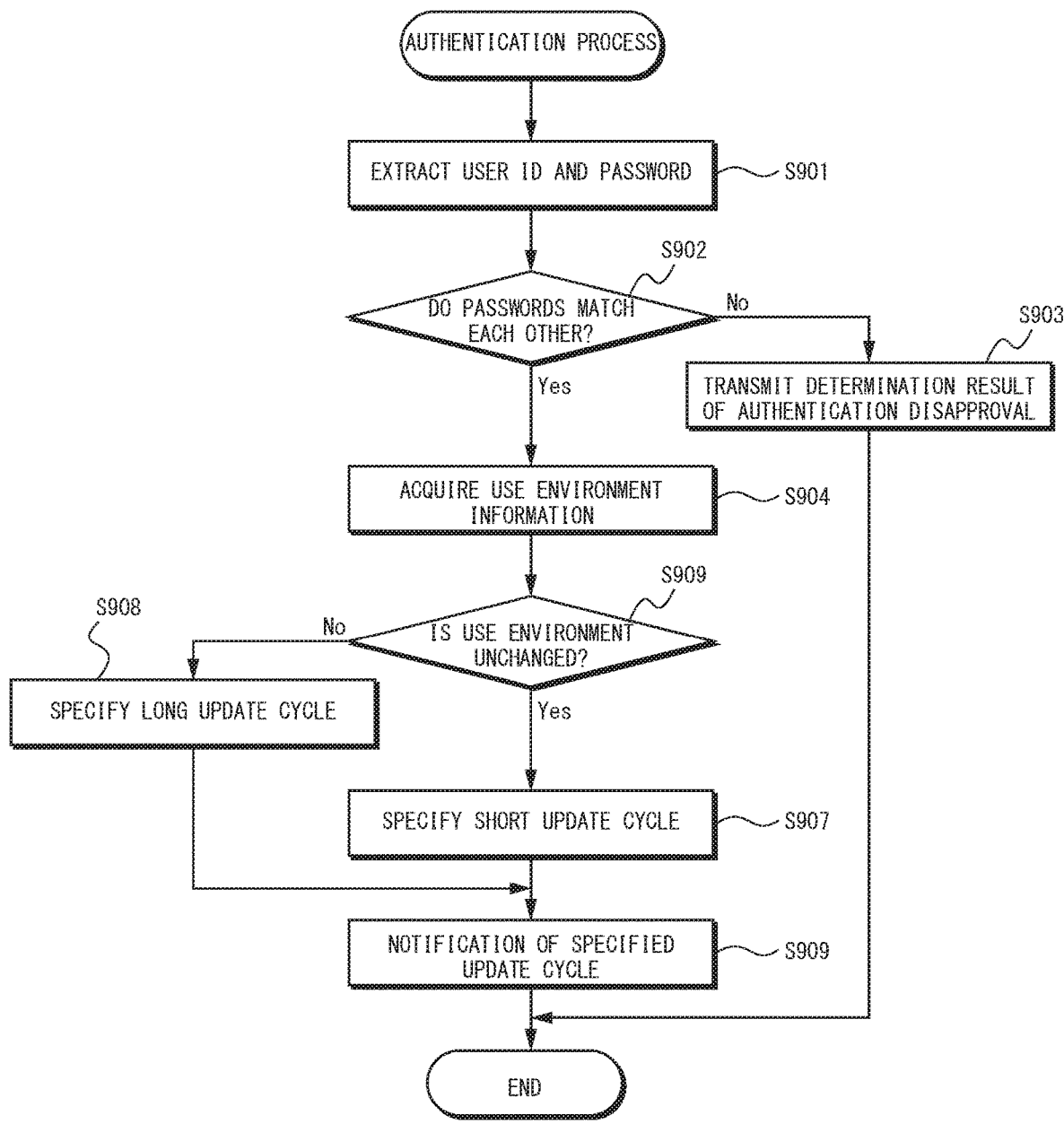
FIG. 9 is a flowchart for illustrating an authentication process in an authentication system according to an embodiment of the present invention.

FIG. 9 is a flowchart for illustrating the authentication process in the authentication system according to the embodiment of the present invention and, specifically, the drawing shows the detail of the first authentication process (S803) in FIG. 8.

Specifically, the authentication server 42 may extract the user ID and the password contained in the received first authentication request (S901), refer to the authentication database 44, and determine whether or not the received password matches the registered password (S902). In a case where the authentication server 42 determines that the passwords do not match each other (No in S902), the authentication server 42 may transmit the determination result in which the authentication is not approved to the information communication terminal device 20 of the user via the usage target system 30 (S903). In contrast to this, in a case where the authentication server 42 determines that the passwords match each other (Yes in S902), the authentication server 42 may subsequently acquire the use environment information contained in or associated with the first authentication request (S904).

Next, in order to determine whether or not the use environment of the information communication terminal device 20 of the user is the same as the previous use environment thereof, the authentication server 42 may refer to the authentication database 44, and determine whether or not the acquired use environment information matches the registered use environment information (S905). It may be determined whether or not the acquired use environment information matches the registered use environment information based on, e.g., similarity calculated according to a predetermined rule instead of exact match. For example, even when the IP addresses do not match each other, in a case where the device IDs and the cookies match each other, the authentication server 42 may determine that the similarity is high and the use environment is the same as the previous use environment. Alternatively, the similarity may be calculated based on the weight value of each parameter that constitutes the use environment information, and the sameness may be determined by comparing the similarity with a predetermined threshold value.

Further, the authentication server 42 may determine any length of time as the update cycle according to, e.g., the similarity of the use environment instead of specifying one of the two types of the update cycles.

In a case where the authentication server 42 determines that the use environment is the same as the previous use environment (Yes in S905), the authentication server 42 may specify the long update cycle as the update cycle of the TOTP (S906) and, in a case where the authentication server 42 determines that the use environment is not the same as the previous use environment (No in S905), the authentication server 42 may specify the short update cycle (S907). By way of this, the token management server 46 operates so as to generate the TOTP in the specified update cycle. Subsequently, in order to request the authentication of the user that uses the TOTP having the specified update cycle, the authentication server 42 may transmit an update cycle notification message to the usage target system 30 (S908).

When the usage target system 30 receives the update cycle notification message from the authentication server 42, the usage target system 30 may generate the second authentication screen configuration data that includes the message, and transmit the second authentication screen configuration data to the information communication terminal device 20 of the user. The information communication terminal device 20 may display, e.g., the second authentication screen 600 shown in FIG. 6 based on the second authentication screen configuration data. In this example, a message that allows the user to specify the long update cycle is displayed. The user may operate the security token of the reference terminal device 50 according to such a message. By this, the reference terminal device 50 may display the TP presentation screen shown in FIG. 7. The user may enter the displayed TP in the TP entry field 601 of the second authentication screen 600, and select the authentication button 602. By this, the information communication terminal device 20 may transmit the second authentication request that contain the entered TP to the authentication server 42.

The user interface for the user to specify the update cycle is not limited to the user interface described above, and may be configured such that the user selects the specified update cycle using a plurality of radio buttons or option buttons, or a slide bar.

Figure 10:
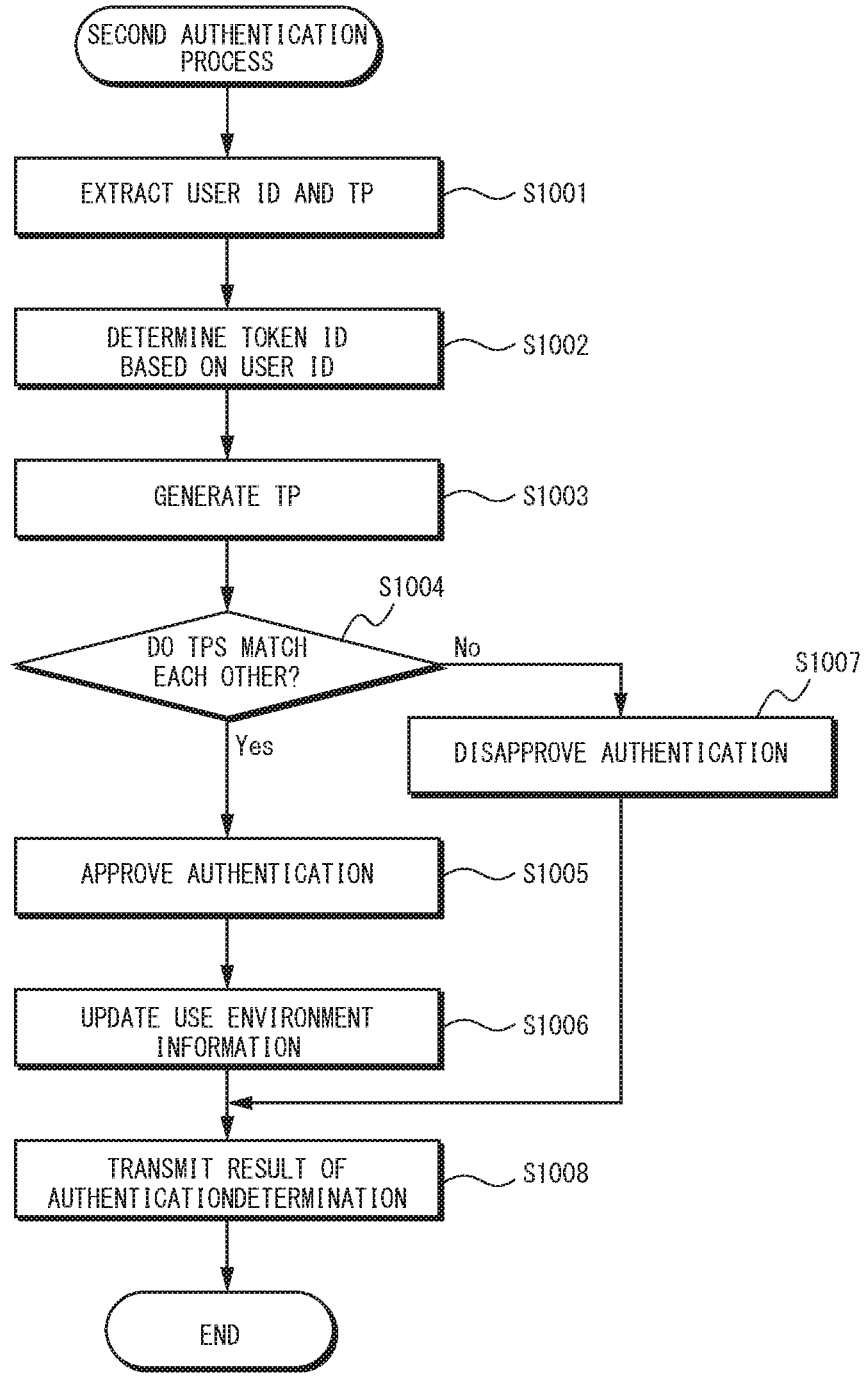
FIG. 10 is a flowchart for illustrating an authentication process in an authentication system according to an embodiment of the present invention.

FIG. 10 is a flowchart for illustrating the authentication process in the authentication system according to the embodiment of the present invention and, specifically, the figure shows the detail of the second authentication process (S804) in FIG. 8.

As shown in the figure, the authentication server 42 may extract the user ID and the TP from the received second authentication request (S1001). Next, the authentication server 42 may refer to the authentication database 44, and determine the token ID based on the extracted user ID (S1002). The authentication server 42 may cooperate with the token management server 46, and generate the TP corresponding to the security token of the user based on the determined token ID (S1003).

The authentication server 42 may determine whether or not the received TP matches the generated TP (S1004). In a case where the authentication server 42 determines that the TPs match each other (Yes in S1004), the authentication server 42 may approve the second authentication to the user (S1005), and update the use environment information registered in the authentication database 44 based on the acquired use environment information (S1006). On the other hand, in a case where the authentication server 42 determines that the TPs do not match each other (No in S1004), the authentication server 42 may not approve the second authentication to the user (S1007). For example, in a case where the TPs are not time-synchronized with each other or the case where the security token that is not associated with the TP is used, the TPs do not match each other. The authentication server 42 may transmit the final authentication result corresponding to the second authentication based on the TP to the usage target system 30 (S1008). Upon receipt of this, the usage target system 30 may transmit the authentication result to the information communication terminal device 20, from whence proceeding to the next process. For example, in a case where the authentication result indicates the disapproval of the authentication, the user may be notified of the login failure. On the other hand, in a case where the authentication result indicates the approval of the authentication, the login of the user is successful and, as a result, it becomes possible to use the usage target system 30.

Thus, according to the present embodiment, it is possible to perform the user authentication using the time-based password (TP) that is updated in synchronization with the long time cycle that is not assumed conventionally. In addition, according to the present embodiment, in a case where the use environment of the information communication terminal device 20 of the user is changed, the user authentication may be performed by using the TP having the short update cycle (i.e., this case means the TOTP), and hence it is possible to avert a reduction in security level.

Further, according to the present embodiment, when the browser is caused to store the previous TP, the user may reuse the previous TP without altering it in a case where the TP having the long update cycle is used, and it becomes possible to omit the operation and the entry of the security token.

Second Embodiment

The present embodiment relates to a user authentication method that allows entry of a TP in addition to entry of a user ID and a password in a first authentication screen (login screen), and a system that implements the user authentication method. That is, the user who is aware that the use environment of the information communication terminal device is not changed can simplify the user authentication procedure by entering the TP having the long update cycle that is assumed not to be updated yet in the first authentication screen in advance.

Figure 11:
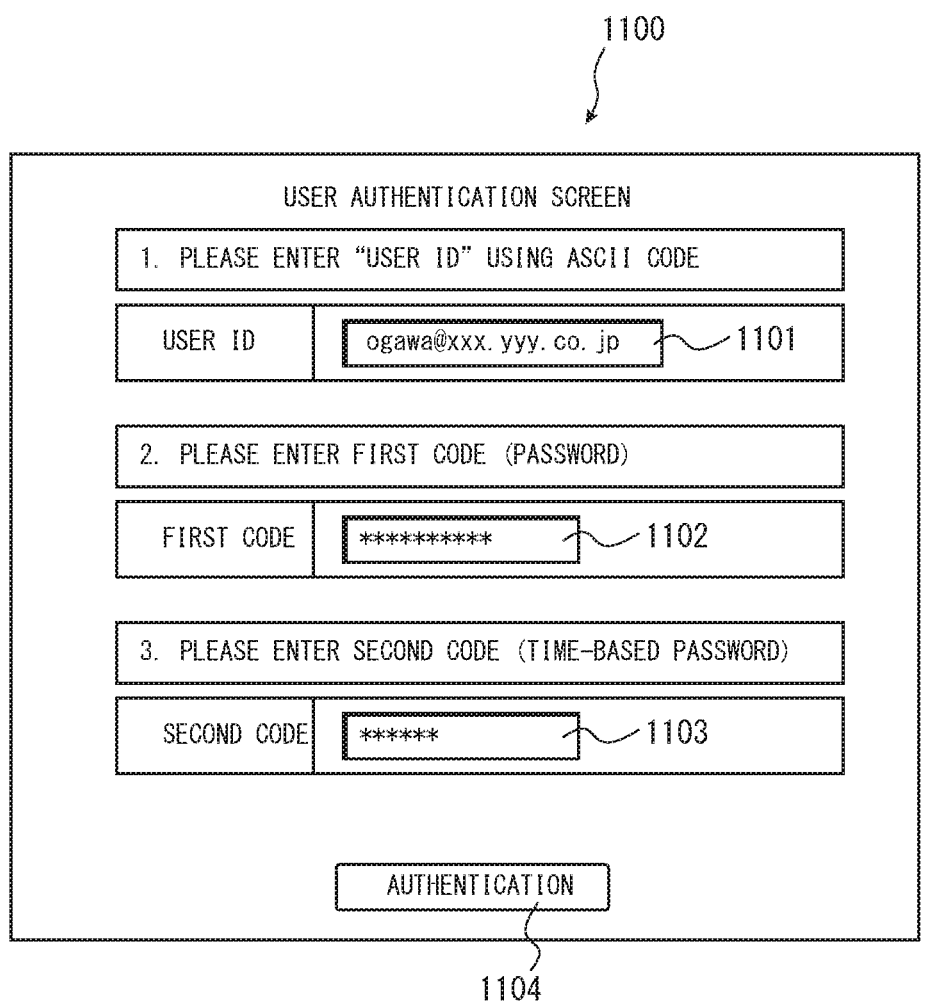
FIG. 11 is a view showing an example of the authentication screen displayed on an information communication terminal device in a user authentication method according to an embodiment of the present invention.

FIG. 11 is a view showing an example of the first authentication screen displayed on the information communication terminal device in the user authentication method according to the embodiment of the present invention. As described above, the user may receive the presentation of the first authentication screen by accessing the usage target system 30. In the example shown in the figure, the browser of the information communication terminal device 20 may display a first authentication screen 1100 in a state in which authentication information of the user stored is entered in accordance with, e.g., the cookie. That is, as shown in the figure, the browser may automatically enter the stored authentication information of the user complementarily in a user ID entry field 1101, a password entry field 1102, and a TP entry field 1103 of the first authentication screen 1100 without the intervention of the entry by the user, and display them.

Figure 12A:
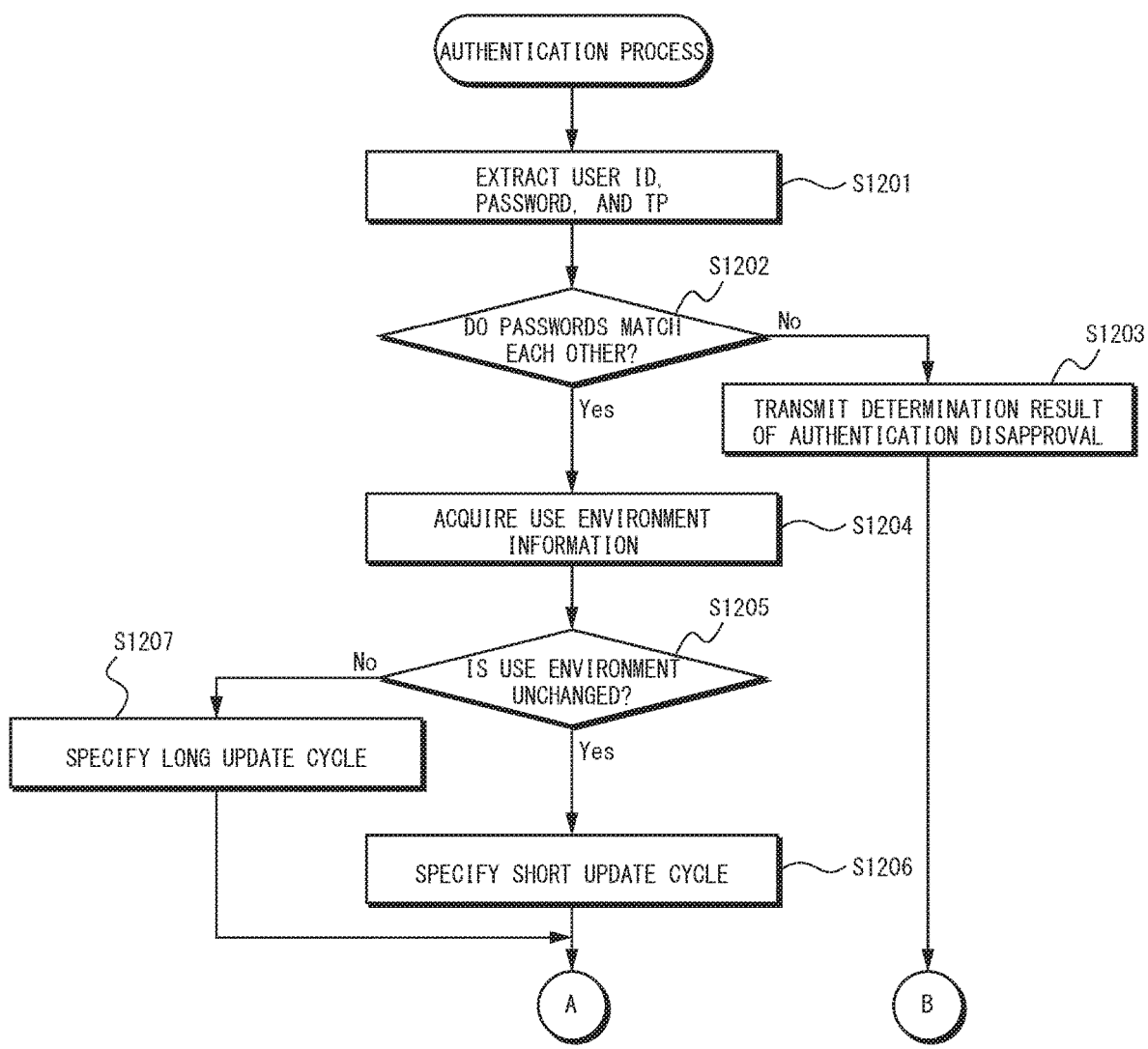
FIG. 12A is a flowchart for illustrating an authentication process in an authentication system according to an embodiment of the present invention.
Figure 12B:
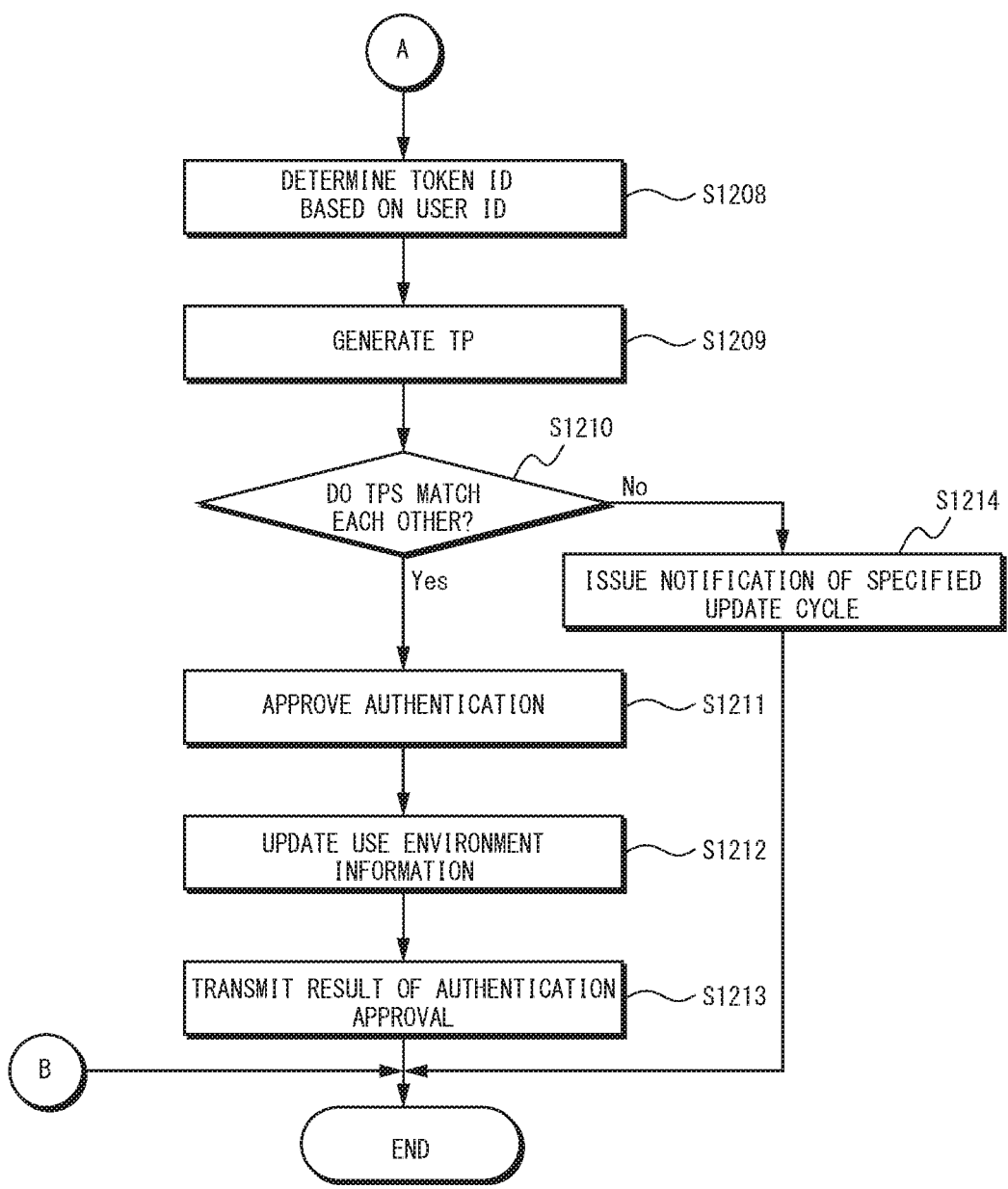
FIG. 12B is a flowchart for illustrating an authentication process in an authentication system according to an embodiment of the present invention.

FIG. 12A and FIG. 12B are flowcharts for illustrating the authentication process in the authentication system according to the embodiment of the present invention.

As shown in FIG. 12A, when the authentication server 42 receives the first authentication request from the information communication terminal device 20 of the user, the authentication server 42 may extract the user ID, the password, and the TP contained in the received first authentication request (S1201), refer to the authentication database 44, and determine whether or not the received password matches the registered password match (S1202). In a case where the authentication server 42 determines that the passwords do not match each other (No in S1202), the authentication server 42 may transmit the determination result in which the authentication is not approved to the information communication terminal device 20 of the user via the usage target system 30 (S1203). In contrast to this, in a case where the authentication server 42 determines that the passwords match each other (Yes in S1202), the authentication server 42 may subsequently acquire the use environment information contained in or associated with the first authentication request (S1204).

Next, in order to determine whether or not the use environment of the information communication terminal device 20 of the user is the same as the previous use environment, the authentication server 42 may refer to the authentication database 44, and determine whether or not the determined use environment information matches the registered use environment information (S1205). As described above, it may be determined whether or not the determined use environment information matches the registered use environment information based on, e.g., the similarity calculated in accordance with the predetermined rule instead of the exact match.

In a case where the authentication server 42 determines that the use environment is the same as the previous use environment (Yes in S1205), the authentication server 42 may specify the long update cycle as the update cycle of the TP (S1206) and, in a case where the authentication server 42 determines that the use environment is different from the previous use environment (No in S1205), the authentication server 42 may specify the short update cycle (S1207). By way of this, the token management server 46 may operate so as to generate the TP in the specified update cycle.

Next, the authentication server 42 may refer to the authentication database 44, and determine the token ID based on the extracted user ID (S1208). Subsequently, the authentication server 42 may cooperate with the token management server 46 to generate the TP corresponding to the security token of the user based on the determined token ID (S1209).

The authentication server 42 may determine whether or not the received TP matches the generated TP (S1210). In a case where the authentication server 42 determines that the TPs match each other (Yes in S1210), the authentication server 42 may approve the first authentication to the user (S1211), and update the use environment information registered in the authentication database 44 based on the acquired use environment information (S1212). Thereafter, the authentication server 42 may transmit the authentication result to the usage target system 30 (S1213). That is, in this case, the authentication may be approved based on the password and the TP, and hence the result of the first authentication may be the final authentication result.

On the other hand, in a case where the authentication server 42 determines that the first TPs do not match each other (No in S1210), in order to request the second authentication of the user that uses the TP having the short update cycle, the authentication server 42 may transmit the update cycle specification message to the usage target system 30 (S1214). When the usage target system 30 receive the update cycle specification message from the authentication server 42, the usage target system 30 generate the second authentication screen configuration data containing the message, and transmit the second authentication screen configuration data to the information communication terminal device 20 of the user. Thereafter, the user may enter the TP having the specified short update cycle in the second authentication screen and may be authenticated by the second authentication and, this process is the same as the above-described process, and hence the description thereof will be omitted.

Thus, according to the present embodiment, as the user enters the TP together with the user ID and the password in one authentication screen, the user can simplify the user authentication procedure. Further, the user who is aware that the use environment of the information communication terminal device 20 is not changed can use the TP having the long update cycle stored in the browser without altering it and accordingly omit the entry procedure. On the other hand, in a case where the use environment of the information communication terminal device 20 is changed, as the user is requested to have the TP again, it is possible to avert a reduction in security level resulting from the use of the TP having the long update cycle, and to perform the authentication at the security level that can provide practicality.

Third Embodiment

The present embodiment relates to a user authentication method in which an appropriate authentication screen is presented to a user based on use environment information that can be acquired when a usage target system receives a use start request from an information communication terminal device of the user, and a system that implements the user authentication method. That is, in a case where it is determined that the use environment of the information communication terminal device is not changed based on the access of the use start by the user, the user can simplify the user authentication procedure by entering only the user ID and the TP in the first authentication screen.

In the present embodiment, it is assumed that the user is authenticated and permitted to use the usage target system 30 lately, and the authentication with the TP having the long update cycle is permitted. In addition, it is assumed that the present access to the usage target system 30 by the user has been performed within the update cycle from the previous authentication.

Figure 13:
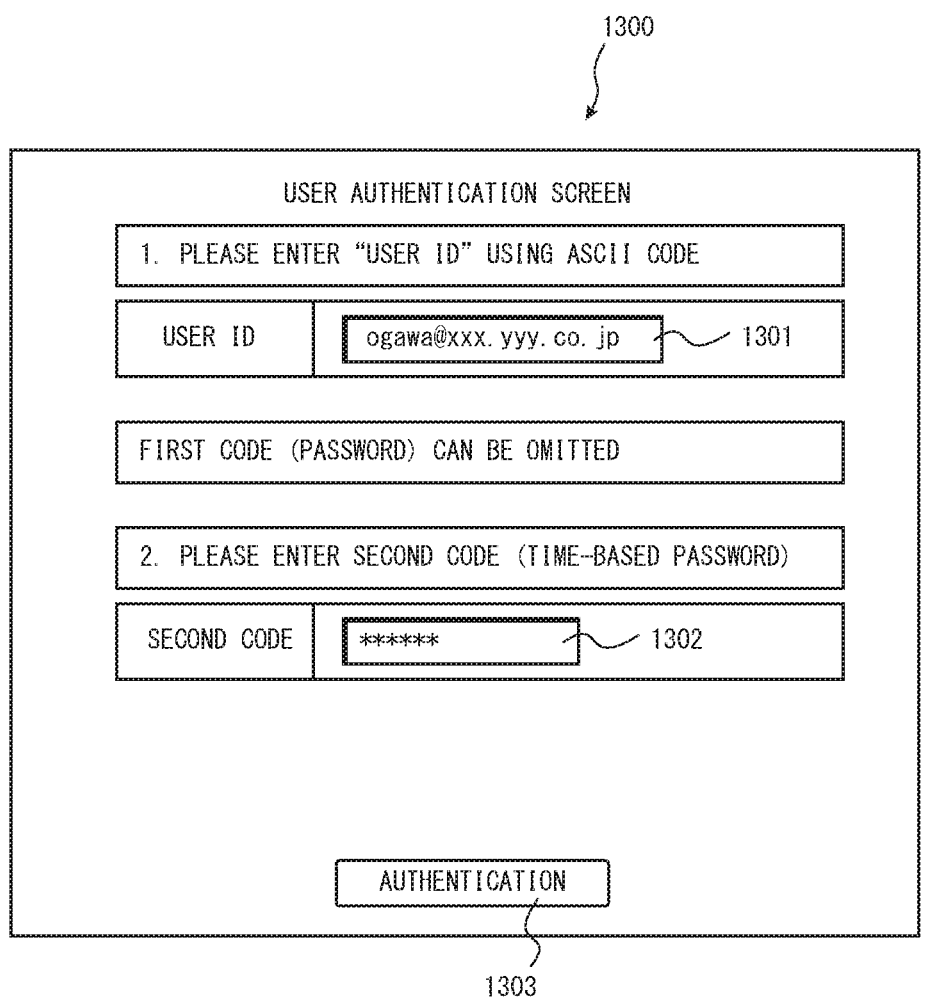
FIG. 13 is a view showing an example of an authentication screen displayed on an information communication terminal device in a user authentication method according to an embodiment of the present invention.

As described above, the user may operate the browser on the information communication terminal device 20 in order to use the usage target system 30, and the information communication terminal device 20 may thereby transmit the use start request to the usage target system 30. The usage target system 30 may acquire the use environment information (e.g., the IP address or the cookie of the information communication terminal device 20) that can be collected under, e.g., the protocol communication, and determine whether or not the use environment of the information communication terminal device 20 is the same as the previous use environment based on the acquired use environment information. In a case where the usage target system 30 determines that the use environment of the information communication terminal device 20 is the same as the previous use environment, the usage target system 30 may transmit, e.g., the first authentication screen configuration data that configures a authentication screen 1300 shown in FIG. 13 to the information communication terminal device 20. By way of this, the browser of the information communication terminal device 20 may display the authentication screen 1300 in a state in which the stored user ID and the stored TP are entered in a user ID entry field 1301 and a TP entry field 1302 based on the cookie or the like. When the user confirms that the user ID and the TP are entered in the authentication screen 1300, the user may select an authentication button 133. By this, the information communication terminal device 20 may transmit the authentication request containing the user ID and the TP to the usage target system 30, and the usage target system 30 may transmit the received authentication request to the authentication system 40. The authentication system 40 may perform the authentication by determining whether or not the TPs match each other based on the user ID and the TP contained in the received authentication request, and transmit the authentication result to the usage target system 30.

Figure 5:
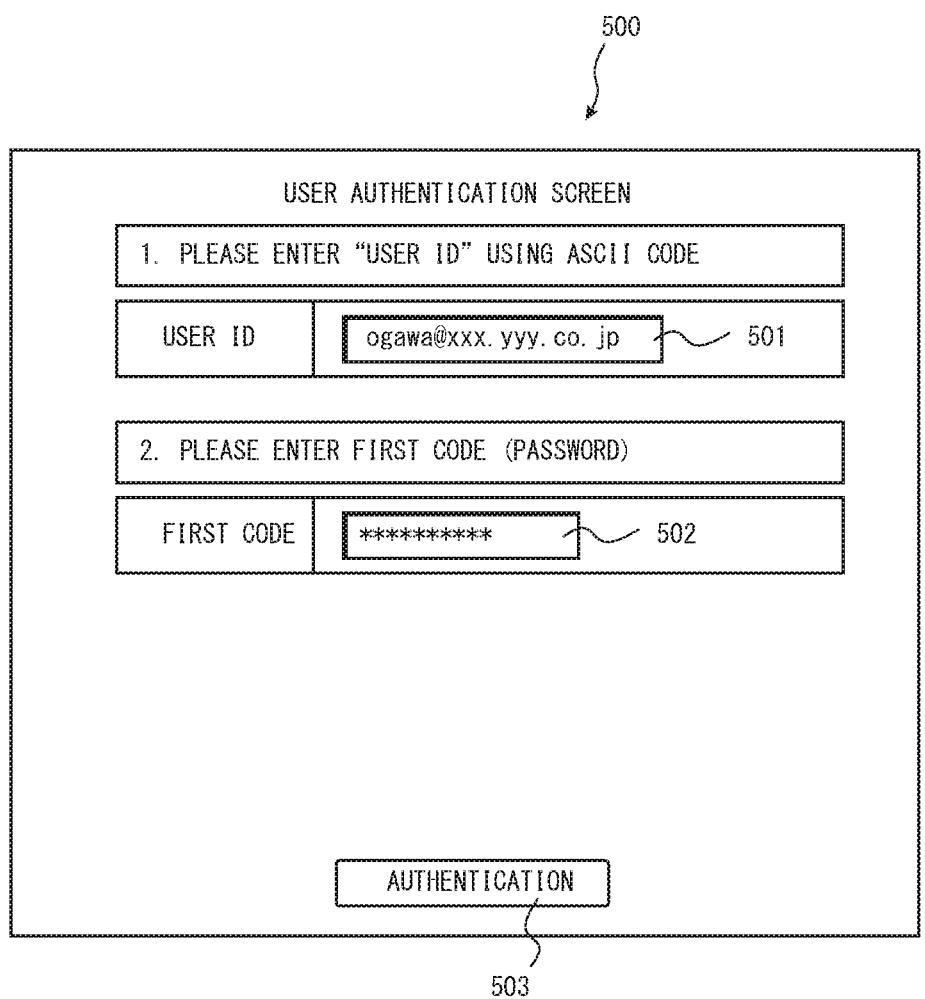
FIG. 5 is a view showing an example of an authentication screen displayed on an information communication terminal device in a user authentication method according to an embodiment of the present invention.

On the other hand, in a case where the usage target system 30 determines that the use environment of the information communication terminal device 20 is different from the previous use environment based on the acquired use environment information, the usage target system 30 may present, e.g., the first authentication pattern screen 500 shown in FIG. 5 to the user. That is, in this case, as described above, the usage target system 30 may request the first authentication and the second authentication of the user. Alternatively, the usage target system 30 may be configured so as to omit the first authentication and request the second authentication with the TP having the short update cycle.

Thus, according to the present embodiment, in a case where the usage target system 30 determines that the use environment of the information communication terminal device 20 of the user is not changed, the usage target system 30 may request the TP instead of the conventional password, and hence the user can use the TP having the long update cycle stored in the browser for the entry without altering it, and can omit the entry procedure. On the other hand, in a case where the use environment of the information communication terminal device 20 is changed, the first authentication and the second authentication of the user may be requested, and hence it is possible to secure at least the conventional security level, and to perform the authentication at the security level that can provide practicality.

Fourth Embodiment

The present embodiment relates to a user authentication method in which a TP that is generated in an update cycle specified in accordance with a use environment of an information communication terminal device of a user is embedded in a code table in accordance with a predetermined rule, wherein the code table is presented to the user, and a system that implements the user authentication method.

Specifically, the reference terminal device 50 of the present embodiment may be configured to display the code table in which the generated TP is embedded in accordance with a pre-registered password derivation pattern. The password derivation pattern may be obtained by defining the arrangement pattern of a plurality of specific cells (elements) selected from among a group of cells that constitutes a geometric pattern by the user in any order, and the selection order. In other words, the password derivation pattern may be an arrangement rule indicative of which cells in the geometric pattern are selected in what order. It is noted that the password derivation pattern does not denote specific values assigned to specific cells in the geometric pattern, but represents information indicative of which cells are selected in what order. The user extracts a number or the like allocated to each cell of the password derivation pattern in predetermined order to thereby reproduce the password (or the token code) of the user.

Figure 14:
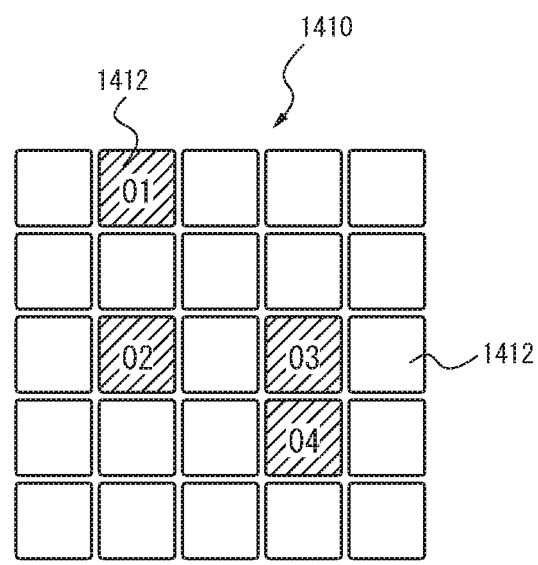
FIG. 14 is a view for illustrating a password derivation pattern used in a user authentication method according to an embodiment of the present invention.
Figure 14:
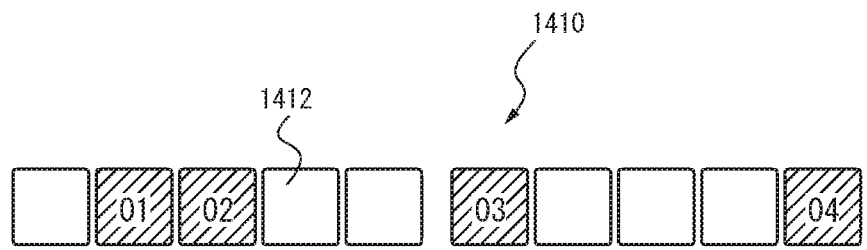

FIG. 14 is a view for illustrating the password derivation pattern used in the user authentication method according to the embodiment of the present invention.

Specifically, FIG. 14(a) shows an example of the password derivation pattern in a geometric pattern 1410 that is configured into, e.g., a lattice shape having 5 rows and 5 columns. In the figure, cells 1412 selected by the user are hatched so as to be visually distinguishable, and numbers are written in cells in an order in which they are selected. Thus, one or more cells 1412 selected from the geometric pattern 1410 in order by the user serve as the password derivation pattern. The position of each cell is determined as, e.g., "(row, column)." Thus, the password derivation pattern in this example is determined as, e.g., "(0, 1), (3, 2), (3, 4), (4, 4)." Alternatively, when sequential numbers are assigned laterally with the left top cell 1412 to which "1" is assigned, the password derivation pattern is determined as "2, 12, 14, 19."

FIG. 14(b) shows an example of a linear geometric pattern. In this example, a geometric pattern 1210 is constituted by blocks each having 5 cells 1412 such that the user can easily determine the position of the selected cell 1412.

The shape or locus of the geometric pattern 1410, the number of cells 1412 constituting the geometric pattern 1410, the number of cells 1412 to be selected, and the selection order are arbitrarily determined, and are appropriately set in accordance with the security level in the user authentication. It is noted that the concept of the password derivation pattern is described in detail in Patent Document 1.

Figure 15:
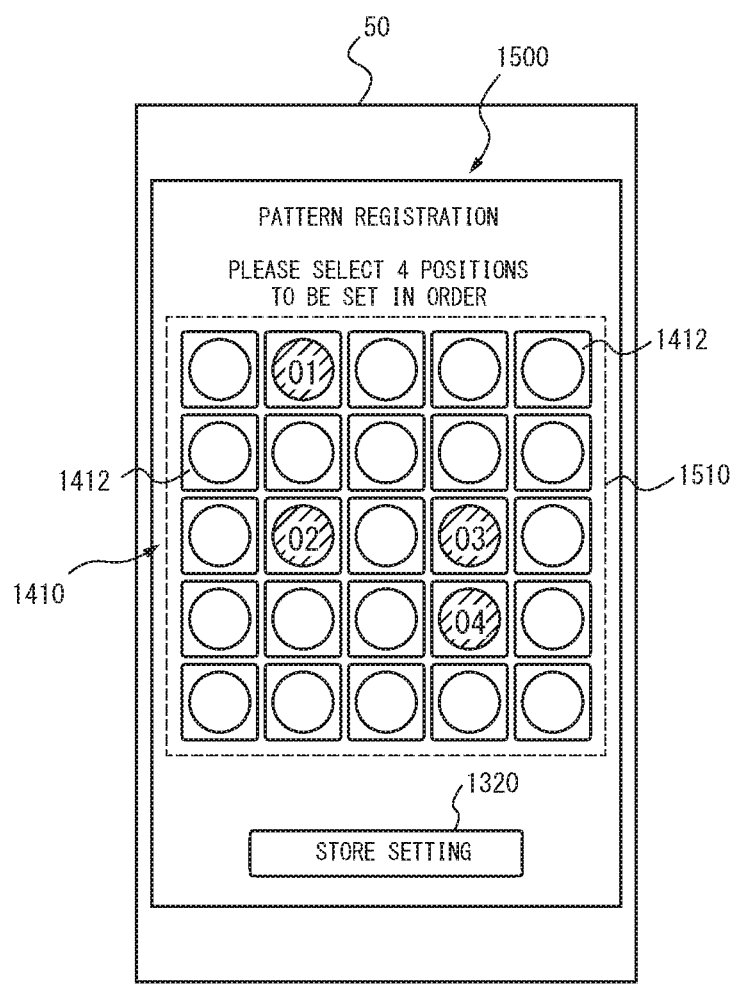
FIG. 15 is a view for illustrating a password derivation pattern registration screen in a user authentication method according to an embodiment of the present invention.

FIG. 15 is a view for illustrating a password derivation pattern registration screen in the user authentication method according to the embodiment of the present invention, and the figure shows an example of the password derivation pattern registration screen displayed on the user interface of the reference terminal device 50. In the present embodiment, such a registration screen may be implemented by the function of a security token program installed in the reference terminal device 50, but the registration screen is not limited thereto. In another embodiment, the registration screen may be configured by a screen configuration program described according to a page description language (e.g., HTML5 or the like), and may be provided by accessing the computing system on the administrator side (e.g., the usage target system 30 or the authentication server 42).

As shown in the figure, a password derivation pattern registration screen 1500 may include, e.g., a password derivation pattern specification area 1510 and a setting preservation button 1520.

The password derivation pattern specification area 1510 may be configured to include the geometric pattern 1410 consisting of the group of the cells 1412 of 5×5 in number, and be an area for the user to specify a predetermined number (e.g., 4) of the cells 1412 in order. That is, the user may select the cells 1412 on the geometric pattern 1410 by tapping on the predetermined number of the cells 1412 corresponding to the password derivation pattern that the user desires to register in order. Every time the cell 1412 is selected, the selected cell 1412 may be highlighted in, e.g., a predetermined color so as to be visually distinguished and, in addition, the number indicative of the order of the selection may be displayed in the cell 1412. Thus, the positions of the selected cells 1412 in the geometric pattern 1410 and the order in which the cells 1412 are selected correspond to the password derivation pattern.

In the registration of the password derivation pattern, for example, the same cells 1412 may be selected twice or more. For example, the cell that is selected twice is highlighted in another color, and two numbers are displayed therein. In this case, each number may be displayed by using, e.g., a balloon in order to prevent the two numbers from overlapping each other to hamper visual recognition. In addition, the order in which the element is selected may be indicated by a line that connects the selected cells 1412 on the geometric pattern 1410 instead of or in addition to the number.

Further, the selection of each cell 1412 may be performed by performing drag on the geometric pattern in a unicursal manner instead of tap. That is, the user may draw a substantially straight line while performing drag with the selected first element used as the starting point, and select a predetermined number of elements while temporarily stopping on the element to be selected. The reference terminal device 50 may receive entered information while determining an operation action such as tap, drag, or swipe based on, e.g., the position in the registration screen with which a finger comes into contact and contact time.

The setting preservation button 1520 may be a button for storing a series of the selected cells 1412. For example, in a case where the user selects the cells 1412 in order and the number of the selected cells reaches a predetermined number, the setting preservation button 1520 may be enabled. The reference terminal device 50 may register the password derivation pattern based on a series of the selected cells by tapping on the setting preservation button 1520 by the user.

It is also possible to perform the registration of the password derivation pattern by a method other than the method described in the present description. For example, the registration method of the password derivation pattern disclosed in Patent Document 1 described above can also be applied to the present invention.

As described above, the reference terminal device 50 of the present embodiment may operate so as to present the TOTP generated in the specified update cycle to the user via the code table. Specifically, the reference terminal device 50 may embed the TP generated in the specified update cycle in the code table in accordance with the predetermined rule, and present the code table in which the TP is embedded to the user.

Figure 16:
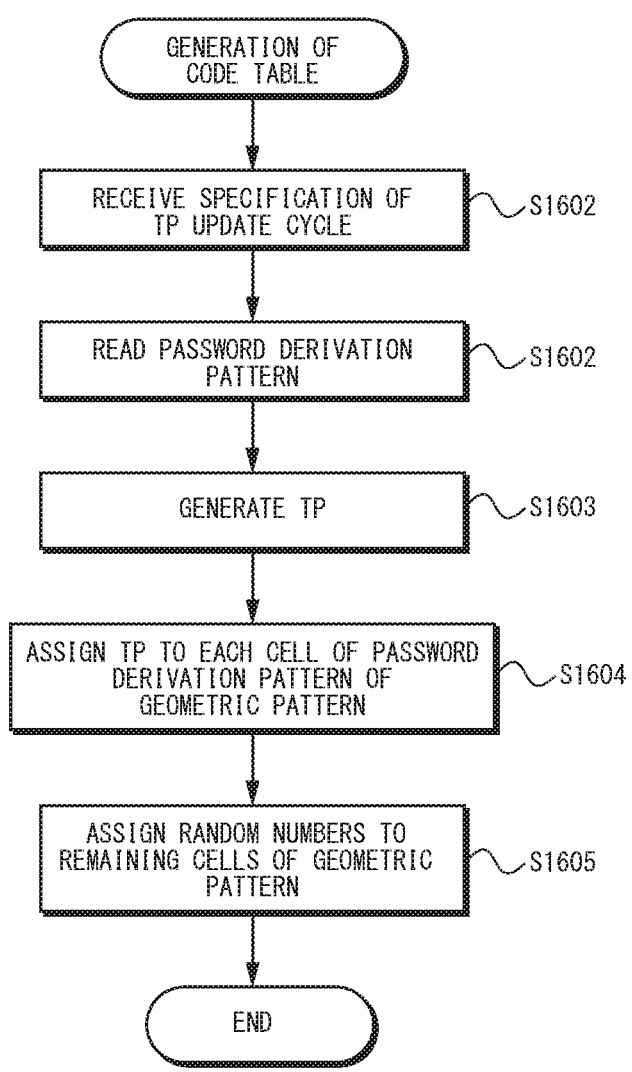
FIG. 16 is a flowchart for illustrating a process of the reference terminal device in a user authentication method according to an embodiment of the present invention.

FIG. 16 is a flowchart for illustrating the process of the reference terminal device in the user authentication method according to the embodiment of the present invention. The above process may be implemented by, e.g., the security token executed on the reference terminal device 50.

As shown in the figure, the reference terminal device 50 may receive the specification of the update cycle of the TP by the user with the activation of the security token (S1601). Next, the reference terminal device 50 may read out the stored password derivation pattern of the user (S1602), and generate the token code that is time-synchronized with the token code generated by the token management server 46, i.e., the TP (S1603). The reference terminal device 50 may then assign numbers that constitute the generated TP or the like to the respective cells constituting the password derivation pattern in the code table from the top sequentially (S1604). Subsequently, the reference terminal device 50 may assign numbers or the like that are generated randomly to the remaining cells in the code table (S1605) to complete the code table. When the reference terminal device 50 generates the code table, the reference terminal device 50 may display a reference screen that includes the code table (S1606).

Figure 17:
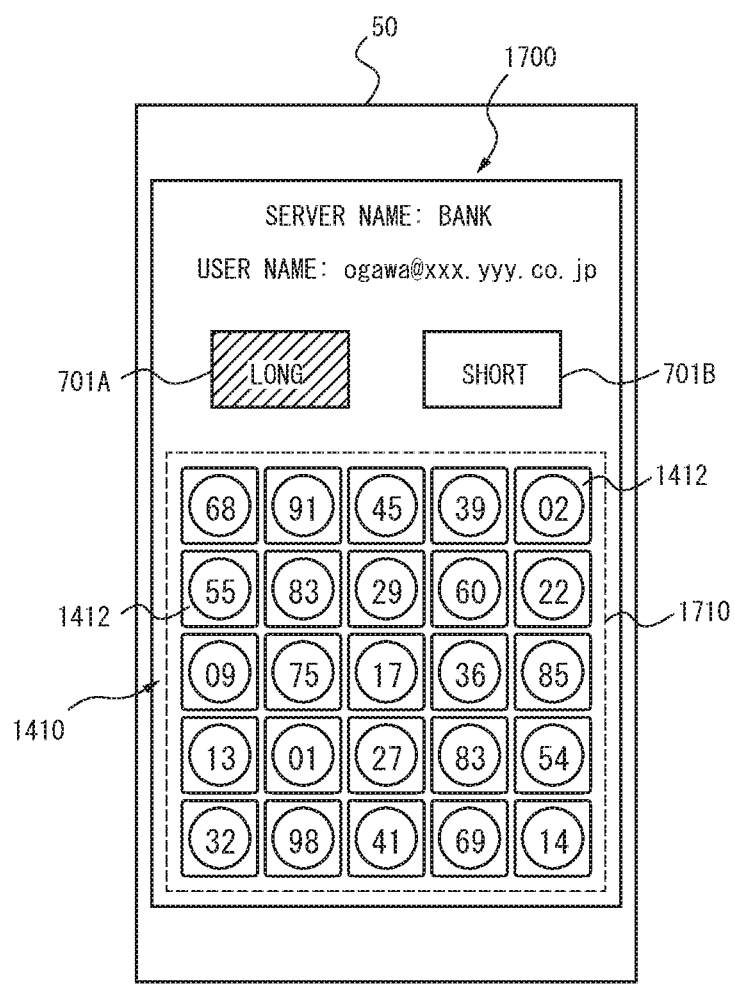
FIG. 17 is a view showing an example of a reference screen displayed on a reference terminal device in an user authentication method according to an embodiment of the present invention.

FIG. 17 is a view showing an example of the reference screen displayed on the user interface of the reference terminal device in the user authentication method according to the embodiment of the present invention. As shown in the figure, a reference screen 1700 may include update cycle specification buttons 701A and 701B and a code table 1710. The code table 1710 may be a table in which numbers or the like that seem to be random are assigned to the respective cells 1412 of the geometric pattern. The user may refer to the code table 1710, and extract the numbers, and the like, assigned to the individual cells 1412 corresponding to the password derivation pattern of the user in order. The user may enter the numbers extracted in order in the second authentication screen as the TP. For example, according to the password derivation pattern shown in FIG. 15, numbers "91753683" are extracted from the code table 1710. The user may enter the extracted TP in the above-described second authentication screen displayed in the browser on the information communication terminal device 20.

Thus, according to the present embodiment, the reference terminal device 50 may embed the generated TP in the code table before displaying the code table, instead of displaying the generated TP without altering it, and hence it is possible to further enhance the security level. For example, even when the user loses the reference terminal device 50 and a third party who has found the reference terminal device 50 can operate the generation of the TP with intension of performing unauthorized access, the third party cannot extract the TP without knowing the password derivation pattern, and it is possible to prevent the unauthorized access.

Fifth Embodiment

The present embodiment relates to a user authentication method in which an update cycle of a TP can be changed according to a use environment of an information communication terminal device of a user while a time limit for a user authentication is provided, and a system that implements the user authentication method.

Specifically, the user may access the usage target system 30 in order to use the usage target system 30, and operate the information communication terminal device 20 to cause the browser to display the first authentication screen. The usage target system 30 having received the access from the user may transmit a pre-notification of the authentication request for notifying the authentication system 40 that the authentication request is scheduled to be made in near future in advance to the authentication system 40. When the authentication system 40 receives the pre-notification of the authentication request, the authentication system 40 may operate so as to perform the authentication of only the authentication request received within a predetermined time period. In other words, the authentication process in the authentication system 40 may usually be locked or protected and, in a case where the authentication system 40 receives the pre-notification of the authentication request (lock release request), the authentication system 40 may release the lock for the predetermined time period, and receive the authentication request.

Figure 18A:
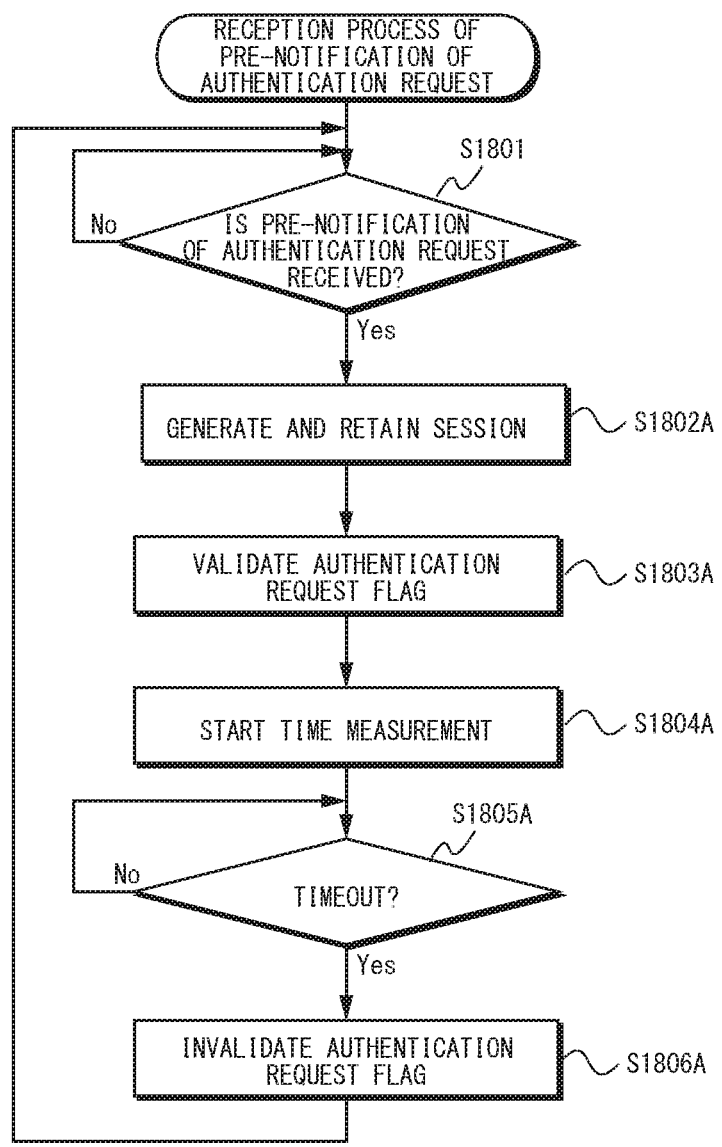
FIG. 18A is a flowchart for illustrating a user authentication method according to an embodiment of the present invention.
Figure 18B:
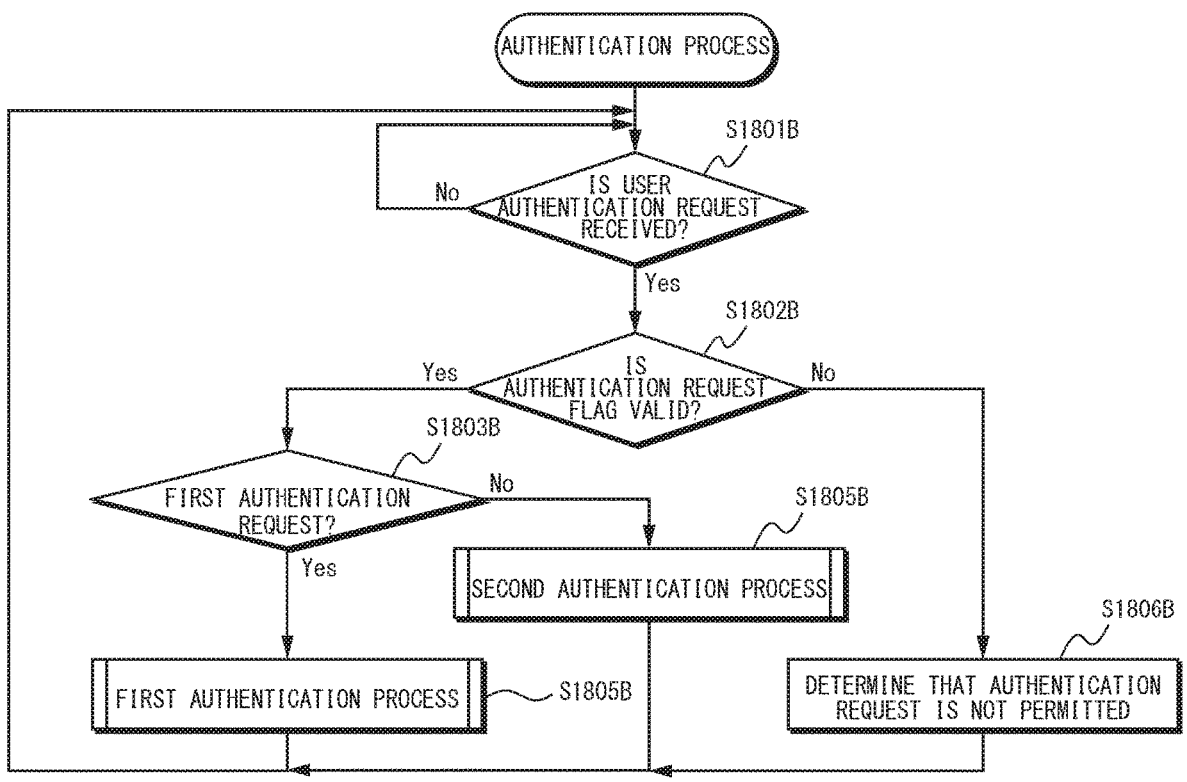
FIG. 18B is a flowchart for illustrating a user authentication method according to an embodiment of the present invention.

FIGS. 18A and 18B are flowcharts for illustrating the user authentication method according to the embodiment of the present invention. Specifically, FIG. 18A shows the reception process of the pre-notification of the authentication request in the authentication system 40, and FIG. 18B shows the process based on the authentication request in the authentication system 40.

First, as shown in FIG. 18A, the authentication server 42 of the authentication system 40 may monitor whether or not the pre-notification of the authentication request has been received via the communication network 10 (S1801A). In a case where the authentication server 42 determines that the pre-notification of the authentication request has been received from the usage target system 30 (Yes in S1801A), the authentication server 42 may create a session for the user (i.e., the information communication terminal 20 of the user) who has transmitted the pre-notification of the authentication request, and maintain the session (S1802A). Subsequently, the authentication server 42 may rewrite the value of a authentication request flag to the created session to a value indicative of validity (S1803A), and start time measurement (S1804A). Then, the authentication server 42 may monitor whether or not the time period obtained by the time measurement has reached a predetermined time period (S1805A). This monitoring may be performed in order to determine whether or not the subsequent user authentication request has arrived within the predetermined time period. In a case where the authentication server 42 determines that the time period obtained by the time measurement has reached the predetermined time period (Yes in S1805A), the authentication server 42 may rewrite the value of the authentication request flag to a value indicative of invalidity (S1806A), and return to the monitoring of the pre-notification of the authentication request (S1801A).

In addition, as shown in FIG. 18B, the authentication server 42 monitors whether or not the user authentication request has been received from the usage target system 30 via the retained session (S1801B). In a case where the authentication server 42 determines that the first authentication request has been received from, e.g., the usage target system 30 via the session (Yes in S1801B), the authentication server 42 may subsequently check whether or not the value of the authentication request flag to the user that is based on the first authentication request is the value indicative of validity (S1802B). In a case where the authentication server 42 determines that the value of the authentication request flag is the value indicative of validity (Yes in S1802B), the authentication server 42 may determine whether or not the authentication request of the user is the first authentication request (S1803). In a case where the authentication server 42 determines that the authentication request is the first authentication request (Yes in S1803), the authentication server 42 may perform the first authentication process (S1804). In contrast to this, in a case where the authentication server 42 determines that the authentication request is not the first authentication request, i.e., the authentication request is the second authentication request (No in S1803), the authentication server 42 may perform the second authentication process (S1805). The first authentication process and the second authentication process may be the same as those described with reference to FIG. 9 and FIG. 10, and hence the description thereof will be omitted. When the authentication server 42 ends the first authentication process or the second authentication process, the authentication server 42 may begin to wait for the reception of the authentication request again (S1801B).

In a case where the authentication server 42 determines that the value of the authentication request flag is the value indicative of invalidity (No in S1802B), the authentication server 42 may determine that the pre-notification of the authentication request is not received, or the pre-notification of the authentication request has been received but a timeout has occurred, determine that the user authentication request is invalid (S1809B), and transmit the determination result to the usage target system 30 as the user authentication request source (S1810B).

It is noted that, in a case where the authentication server 42 approves the first authentication to the first authentication request, the time limit may be prolonged by the predetermined time period. That is, the time limit may be provided for each of the first authentication and the second authentication.

Alternatively, the measurement of the time limit for the user authentication may be started at the point in time when the security token of the reference terminal device 50 is operated. In such an example, the reference terminal device 50 may be configured to be connectable to the usage target system 30 or the like via the communication network 10. That is, when the user operates the security token of the reference terminal device 50 to specify, e.g., the short update cycle in advance and causes the reference terminal device 50 to display the code table in which the TP generated in the specified update cycle is embedded, the reference terminal device 50 may transmit the pre-notification of the authentication request (lock release request) to the authentication system 40 via the usage target system 30. Upon receipt of this, the authentication system 40 may release the lock for the predetermined time period, and become ready for the reception of the authentication request.

Sixth Embodiment

The present embodiment relates to a user authentication method in which a user operates a reference terminal device to directly transmit an update cycle specification message of a TP to the security token of the reference terminal device, and a system that implements the user authentication method. In the present embodiment, the reference terminal device 50 may be configured to be connectable to the usage target system 30 or the like via the communication network 10, and the security token of the reference terminal device 50 may be configured to be able to communicate with the authentication system.

Specifically, when the authentication server 42 specifies the update cycle based on the use environment information according to, e.g., the process shown in FIG. 9, the authentication server 42 may transmit the update cycle specification message to the security token of the reference terminal device 50, and transmit the first authentication result to the usage target system 30. Upon receipt of this, the usage target system 30 transmits the second authentication screen configuration data to the information communication terminal device 20. The other processes are the same as those in the above embodiments, and hence the description thereof will be omitted.

Figure 19:
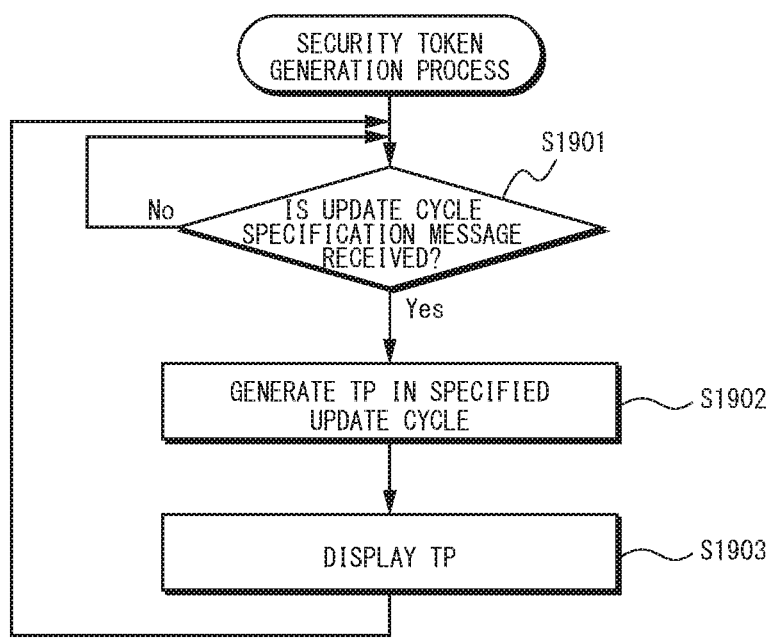
FIG. 19 is a flowchart for illustrating a process of a security token of a reference terminal device 50 in the an authentication method according to an embodiment of the present invention.

FIG. 19 is a flowchart for illustrating the process of the security token of the reference terminal device 50 in the user authentication method according to the embodiment of the present invention.

As shown in the figure, the reference terminal device 50 may wait until the reference terminal device 50 receives the update cycle specification message from the authentication server 42 via the usage target system 30 (S1901). When the reference terminal device 50 receives the update cycle specification message from the authentication server 42 (Yes in S1901), the reference terminal device 50 may generate, e.g., the TP corresponding to the specified update cycle (S1902), and display the generated TP on the user interface (S1903). In a case where the reference terminal device 50 receives the update cycle specification message, the reference terminal device 50 may ask the user whether or not the process is to be executed via the dialog box. Further, the reference terminal device 50 may display the code table in which the TP is embedded instead of displaying the TP without altering it.

Seventh Embodiment

The present embodiment relates to a user authentication method in which the information communication terminal device collects behavior of a user who operates an information communication terminal device (operation behavior of the user) as part of use environment information, and it is determined whether or not the use environment of the information communication terminal device is changed based on the operation behavior of the user, and a system that implements the user authentication method.

Figure 20:
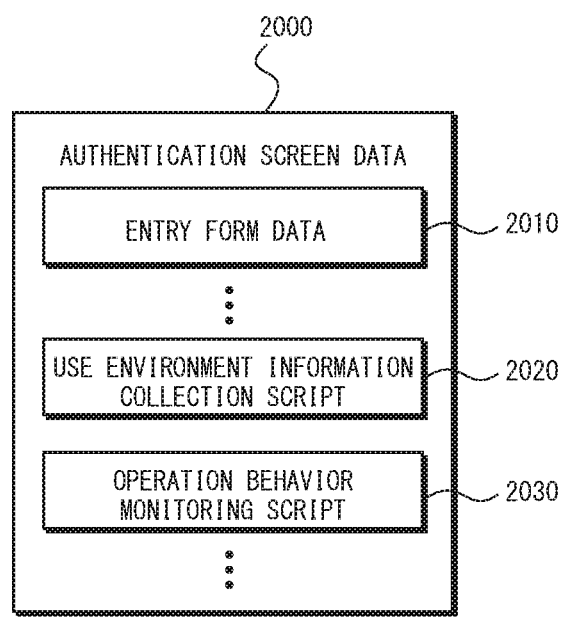
FIG. 20 is a view for illustrating authentication screen configuration data in a user authentication method according to an embodiment of the present invention.

FIG. 20 is a view for illustrating the authentication screen configuration data in the user authentication method according to the embodiment of the present invention. As shown in the figure, authentication screen configuration data 2000 may include, e.g., entry form data 2010, a use environment information collection script 2020, and an operation behavior monitoring script 2030. The authentication screen configuration data 2000 may be, for example, a data set that is described according to a Web page description language such as, e.g., HTML5. The authentication screen configuration data 2000 mentioned herein may be screen configuration data that configures the first authentication screen and/or the second authentication screen described above.

The entry form data 2010 may be data that configures a text entry field or a combo field for entering the time-based password (TP). As described above, the use environment information collection script 2020 may be a script for collecting, e.g., system information such as a device ID (production number) and device configuration information, network information such as an IP address, domain information, and an SSID, and communication session information such as a cookie. The use environment information collection script 2020 may be executed by a selection action of, e.g., a authentication (transmission) button or the like. The operation behavior monitoring script 2030 may be a script for monitoring an entry event to the text entry field and determining an entry mode.

More specifically, the browser that executes the operation behavior monitoring script 2030 may monitor a key entry event and/or a focus movement event, and determine whether the entry to the entry field is performed manually by a keyboard operation, and the like, by the user or performed by an automatic complementary entry function of the browser. As an example, in a case where the browser detects the key entry of a number constituting the TP or the like after a cursor moves to the TP entry field 1103 shown in FIG. 11, the browser may determine that the entry is manual entry. In a case where the time interval of the key entry to the TP entry field 1103 is varied or the operation with an editing key, and the like, is performed as well, the browser may determine that the entry is the manual entry. As another example, in a case where a time period from the point of time when the cursor moves to the TP entry field 1103 to the selection of the authentication button 1104 is shorter than a predetermined time period, the browser can determine that the entry is the automatic entry by the automatic complementary entry function. Further, as another example, in a case where the browser enters data retained in a clipboard in the TP entry field 1103 by pasting, the browser may determine that the entry is the automatic entry. The determination result of such an operation behavior of the user may be integrated with the use environment information to be collected.

The authentication system 40 may determine whether or not the use environment of the information communication terminal device 20 is changed according to the operation behavior of the user in the use environment information contained in the user authentication request transmitted from the information communication terminal device 20. For example, the authentication system 40 may determine that the use environment of the information communication terminal device 20 is changed in a case where the use environment information indicates the manual entry, the authentication system 40 may determine that the use environment of the information communication terminal device 20 is not changed in a case where the use environment information indicates the automatic entry, and the authentication system 40 may determine the update cycle of the TP according to the determination, as described above.

Thus, according to the present embodiment, it is possible to determine whether or not the use environment of the information communication terminal device 20 is changed based on the operation behavior of the user on the information communication terminal device 20.

The above embodiments are examples for describing the present invention, and the present invention is not limited only to the embodiments. The present invention can be carried out in various modes without departing from the gist thereof.

For example, in the methods disclosed in the present description, the steps, the operations, or the functions may be executed in parallel or in different order as long as a contradiction does not arise in the result. The described steps, operations, and functions are provided as mere examples, some of the steps, operations, and functions can be omitted without departing from the gist of the invention or may be coupled into one step, operation, and function, and another step, operation, or function may be added.

In addition, the present description discloses various embodiments, a specific feature (technical matter) in one embodiment can be appropriately improved and added to another embodiment or can be replaced with a specific feature in the other embodiment, and such an embodiment is contained in the gist of the present invention.

INDUSTRIAL APPLICABILITY

The present invention can be widely used in the field of user authentication techniques for computing systems.

REFERENCE SIGNS LIST

1 Computing system
10 Communication network
12 Computer network
14 Carrier network
20 Information communication terminal device
30 Usage target system
40 Authentication system
42 Authentication server
44 Authentication database
46 Token management server
50 Reference terminal device

The invention claimed is:

1. A user authentication method executed by an authentication system that performs authentication of a user who performs access from an information communication terminal device in order to use a usage target system by using a reference terminal device that includes a security token capable of generating a time-based password, the user authentication method comprising:
setting an update cycle of the time-based password to a first update cycle;
receiving a user authentication request including a time-based password generated by the security token according to the set first update cycle;
performing the authentication based on the time-based password contained in the received user authentication request;
acquiring use environment information of the information communication terminal device, the use environment information being information related to a security level of the information communication terminal device;
storing the acquired use environment information in an authentication database; and
setting the update cycle of the time-based password to a second update cycle shorter than the first update cycle, in a case where determination is made that a use environment of the information communication terminal device is changed based on previously-stored use environment information and the latest stored use environment information.

2. The user authentication method according to claim 1, further comprising:
transmitting a message indicative of the set update cycle to the information communication terminal device in order to notify the user of the set update cycle such that the time-based password is generated in accordance with the set update cycle.

3. The user authentication method according to claim 1, further comprising controlling the security token of the reference terminal device such that the time-based password is generated in accordance with the set update cycle.

4. The user authentication method according to claim 1, further comprising performing, in a case where a pre-notification of an authentication request is received from the information communication terminal device, the authentication based on the user authentication request received within a predetermined time period from the reception of the pre-notification of the authentication request.

5. A user authentication method executed by an authentication system that performs authentication of a user who performs access from an information communication terminal device in order to use a usage target system by using a reference terminal device that includes a security token capable of generating a time-based password, the user authentication method comprising:
storing, for each user, in an authentication database, user information including token information related to the security token and use environment information related to a use environment of the information communication terminal device of the user and associated with the user information;
receiving a user authentication request transmitted from the information communication terminal device used by one user who is to be authenticated in order to use the usage target system;
setting an update cycle of a time-based password based on use environment information contained in the user authentication request;
generating a time-based password according to the set update cycle; and performing the authentication of the one user based on a time-based password transmitted from the information communication terminal device and the generated time-based password, wherein the setting of the update cycle includes setting the update cycle of the time-based password to a first update cycle in a case where determination is made that the use environment information associated with the received user authentication request is equal to the use environment information stored in the authentication database, and setting the update cycle of the time-based password to a second update cycle shorter than the first update cycle in a case where determination is made that the use environment information associated with the received user authentication request is unequal to the use environment information stored in the authentication database.

6. The user authentication method according to claim 5, further comprising:

updating the use environment information stored in the authentication database based on the use environment information associated with the received user authentication request.

7. The user authentication method according to claim 6, wherein the use environment information includes at least any of system information, network information, and communication session information of the information communication terminal device.

8. The user authentication method according to claim 5, wherein the time-based password transmitted from the information communication terminal device is a time-based password stored in the information communication terminal device in previous authentication.

9. A user authentication system performing authentication of a user who performs access from an information communication terminal device in order to use a usage target system by using a reference terminal device that includes a security token capable of generating a time-based password, the user authentication system comprising:

an authentication database that stores user information of the user; and a hardware processor configured to perform functions of:

an authentication server that refers to the authentication database and performs the authentication based on a user authentication request received from the information communication terminal device; and a token management server that generates a time-based password that is time-synchronized with a time-based password generated by the security token in accordance with a set update cycle, wherein the authentication server sets the update cycle of the time-based password to a first update cycle, wherein the authentication server receives a user authentication request including the time-based password generated by the security token from the information communication terminal device, and performs the authentication based on the time-based password contained in the received user authentication request, and wherein the authentication server acquires use environment information of the information communication terminal device, stores the acquired use environment information in an authentication database, and sets the update cycle of the time-based password to a second update cycle shorter than the first update cycle in a case where the authentication server determines that a use environment of the information communication terminal device is changed based on previously-stored use environment information and the latest stored use environment information, wherein the use environment information is information related to a security level of the information communication terminal device.

10. The user authentication system according to claim 9, wherein the authentication server transmits a message indicative of the set update cycle to the information communication terminal in order to notify the user of the set update cycle such that the time-based password is generated in accordance with the set update cycle.

11. The user authentication system according to claim 9, wherein the authentication server controls the security token of the reference terminal device such that the time-based password is generated in accordance with the set update cycle.

12. The user authentication system according to claim 9, wherein the authentication server performs, in a case where the authentication server receives a pre-notification of an authentication request from the information communication terminal device, the authentication based on the user authentication request received within a predetermined time period from the reception of the pre-notification of the authentication request.

13. A user authentication system performing authentication of a user who performs access from an information communication terminal device in order to use a usage target system by using a reference terminal device that includes a security token capable of generating a time-based password, the user authentication system comprising:

an authentication database that stores, for each user, user information including token information related to the security token and use environment information related to a use environment of the information communication terminal device of the user and associated with the user information; and a hardware processor configured to performs functions of:

a token management server that generates a time-based password that is synchronized with a time-based password generated by the security token in a predetermined update cycle based on the token information; and an authentication server that receives a user authentication request transmitted from the information communication terminal device used by one user who is to be authenticated in order to use the usage target system, and performs the authentication based on the user authentication request, wherein the authentication server sets the predetermined update cycle to a first update cycle in a case where the authentication server determines that use environment information associated with the received user authentication request is equal to the use environment information stored in the authentication database, and sets the predetermined update cycle to a second update cycle shorter than the first update cycle in a case where the authentication server determines that the use environment information associated with the received user authentication request is unequal to the use environment information stored in the authentication database, and wherein the authentication server performs the authentication based on a time-based password transmitted from the information communication terminal device and the time-based password generated by the token management server.

14. The user authentication system according to claim 13, wherein the authentication server updates the use environment information stored in the authentication database based on the use environment information associated with the received user authentication request.

15. The user authentication system according to claim 13, wherein the use environment information includes at least any of system information, network information, and communication session information of the information communication terminal device.

16. The user authentication system according to claim 13, wherein the time-based password transmitted from the information communication terminal device is a time-based password stored in the information communication terminal device in previous authentication.

17. The user authentication method according to claim 1, wherein
the first update cycle includes 1 week, 2 weeks, 30 days, 1 month, or a time period therebetween or longer than 1 month.

18. The user authentication method according to claim 1, wherein
the use environment information includes at least any of system information, network information, and communication session information of the information communication terminal device.

19. The user authentication method according to claim 1, wherein
the time-based password transmitted from the information communication terminal device is a time-based password stored in the information communication terminal device for previous authentication.

20. The user authentication system according to claim 9, wherein
the first update cycle includes 1 week, 2 weeks, 30 days, 1 month, or a time period therebetween or longer than 1 month.

* * * * *